United States Patent [19]
Okumura et al.

[11] Patent Number: 5,954,148
[45] Date of Patent: Sep. 21, 1999

[54] CRAWLER APPARATUS FOR VEHICLE

[75] Inventors: Kazumasa Okumura; Tohru Bisaka; Masaaki Kaneko; Yuji Hashimoto, all of Kariya; Syunichi Shibasaki, Toyota; Masanori Kitano, Yokosuka; Yuji Katsuta, Kariya, all of Japan

[73] Assignees: Kabushiki Kaisha Toyoda Jidoshokki Seisakusho; Toyota Jidosha Kabushiki Kaisha, both of Japan

[21] Appl. No.: 08/734,413

[22] Filed: Oct. 17, 1996

[30] Foreign Application Priority Data

| Oct. 18, 1995 | [JP] | Japan | 7-270286 |
| Feb. 27, 1996 | [JP] | Japan | 8-040159 |
| May 24, 1996 | [JP] | Japan | 8-129703 |

[51] Int. Cl.$^6$ ........................... B62D 55/04
[52] U.S. Cl. ............ 180/9.21; 180/9.64; 305/131
[58] Field of Search .................... 305/130, 131, 305/135, 143, 199; 180/9.1, 9.21, 9.26, 9.28, 9.3, 9.5, 9.62, 9.64

[56] References Cited

U.S. PATENT DOCUMENTS

| 1,442,580 | 1/1923 | Norelius | 305/135 |
| 1,579,245 | 4/1926 | Pennington | 305/135 |
| 3,787,099 | 1/1974 | Tucker et al. | 305/135 |
| 4,448,273 | 5/1984 | Barbieri | 180/9.21 |
| 4,953,919 | 9/1990 | Langford | 305/144 |
| 5,452,949 | 9/1995 | Kelderman | 180/9.44 X |
| 5,607,210 | 3/1997 | Brazier | 305/131 |

FOREIGN PATENT DOCUMENTS

| 49-19535 | 2/1974 | Japan . |
| 58-25282 | 2/1983 | Japan . |
| 60-29777 | 2/1985 | Japan . |
| 62-25286 | 2/1987 | Japan . |
| 63-70484 | 10/1988 | Japan . |
| 3-193573 | 8/1991 | Japan . |
| 4-008682 | 1/1992 | Japan . |
| 4-356106 | 12/1992 | Japan . |
| 6-305456 | 11/1994 | Japan . |

*Primary Examiner*—Lanna Mai
*Assistant Examiner*—Avraham H. Lerner
*Attorney, Agent, or Firm*—Beyer & Weaver, LLP

[57] ABSTRACT

A crawler apparatus, or crawler unit, which replaces a vehicle's wheel is disclosed. The crawler includes a drive wheel, a pair of front driven wheels, a pair of rear driven wheels, pairs of intermediate driven wheels, and an endless belt. The belt is wound about the wheels and defines a triangular shape. The drive wheel rotates the belt to move the vehicle. Stopper units are provided at the front and rear sides of the crawler to restrict the forward and rearward pivoting of the crawler about its drive wheel. The drive wheel is supported by a main frame. A sub frame is pivotally supported by the main frame by way of rubber bushings. This structure enables the sub frame to be inclined in the lateral direction of the belt with respect to the main frame. A space is defined between the two wheels of each set of intermediate driven wheels, which are supported by the sub frame. A portion of the drive wheel is inserted in the space defined between the wheels such that the drive wheel and driven wheels overlap one another. Guide rollers are supported at both sides of the drive wheel and cooperate with the drive wheel to support the belt.

31 Claims, 16 Drawing Sheets

CRAWLER APPARATUS FOR VEHICLE

BACKGROUND OF THE INVENTION

1. Field of the Invention

The present invention relates to crawler appratuses that are mounted on vehicles to replace wheels. More particularly, the present invention pertains to a crawler apparatus that includes a drive wheel, driven wheels, and an endless belt wound about the wheels. Rotation of the belt enables the vehicle to travel stably off-road.

2. Description of the Related Art

Known vehicles provided with crawler appratuses are adapted to travel over rough terrain, muddy roads, river banks, and terrain covered with snow. Crawler appratuses replace the normal wheels of the vehicle. Each crawler apparatus has an endless belt that is mounted around a drive wheel and a driven wheel. The drive wheel rotates the belt to move the vehicle. There is a known type of crawler vehicle that has a single crawler apparatus provided on each of its left and right sides. The moving direction of the vehicle is changed by producing a difference between the rotating speed of the left and right crawler appratuses. However, the rotating speed difference between the belts of each apparatus produces a large resistance which acts on the belts. This makes manuevering the vehicle difficult. Furthermore, in this type of crawler vehicle, each crawler apparatus is assembled integrally with the vehicle and is not designed to be replaced with normal wheels.

A frame of the vehicle supports both the drive wheel and the driven wheel of each crawler apparatus. Therefore, the surface of the terrain, along which the vehicle travels, causes vibrations of the driven wheel. The vibrations are transmitted to the body of the vehicle via the frame and the driven wheels. This makes the ride very uncomfortable.

Japanese Unexamined Utility Model Publication Nos. 60-29777, 62-25286 and Japanese Unexamined Patent Publication No. 3-193573 describe improved crawler appratuses. Each of the crawler appratuses is provided with separate frames for the drive wheel and the driven wheel to support each wheel independently. This prevents the vibrations, which are produced when the vehicle is moving, from being transmitted to the body. Elastic members such as rubber and springs are provided between the frames.

Patent Publication No. 3-193573 describes a first type of crawler apparatus that is illustrated in FIG. 20. The apparatus includes a frame 271 that supports a drive wheel (not shown), a frame 273 that supports driven wheels (intermediate rollers) 272, and a rubber block 274 arranged between the frames 271, 273. The rubber block 274 absorbs the vibrations of the driven wheels 272 and prevents the vibrations from being transmitted to the vehicle body. A belt 275 is wound around the drive wheel and the driven wheels 272. The vehicle is moved by rotating the belt 275 with the drive wheel. The frame 273, together with the driven wheels 272, follows the inclination of the belt 275 as it advances along the surface of the terrain. That is, the frame 273 and the wheels 272 incline in correspondence with the inclination of the belt 275. This prevents the belt 275 from falling off from the driven wheels 272.

Utility Model Publication No. 60-29777 describes a second type of crawler apparatus that is illustrated in FIG. 21. The apparatus includes a pair of frames 282, which support a drive wheel (not shown) and extends at the left and right sides of a driven wheel (lower roller) 281, and a rotary shaft 283, which supports the driven wheel 281 so as to enable the wheel 281 to rotate with respect to the frames 282. The shaft 283 is fastened to each frame 282 by bolts 285 with a buffer plate 284 arranged between the frames 282 and the shaft 283. The buffer plate 284 is formed by superimposing sheets of rubber and steel.

Utility Model Publication No. 62-25286 describes a third type of crawler apparatus that includes a pair of frames to rotatably support driven wheels, another frame to support a drive wheel, and a leaf spring located between the frames.

However, in the first type of crawler apparatus shown in FIG. 20, the deforming direction of the rubber block 274 is not restricted. Thus, the inclining direction of the frame 273 is not restricted. This results in shafts 272a of the driven wheels 272 becoming inclined with respect to the axis of the drive wheel. Thus, the driven wheels 272 become inclined with respect to the belt 275. When in such state, the belt 275 may fall off from the driven wheels 272. Furthermore, the rubber block 274 may be damaged due to the torsion force applied thereto.

In the second type of crawler apparatus shown in FIG. 21, the lateral inclination of the driven wheel 281 is restricted by the bolts 285. Thus, the driven wheel 281 does not follow the inclination of the belt. This may result in the belt falling off the wheels 281.

In the third type of crawler apparatus, which is described in Utility Publication No. 62-25286, the lateral inclination of the driven wheels is allowed by the leaf springs arranged at the left and right sides of the same wheels. However, when the driven wheels are inclined, the urging force of the leaf springs differs between the front and rear sides of the driven wheels. This difference may cause a rotary shaft of the driven wheel to become inclined with respect to the axis of the drive wheel and result in the belt falling off the driven wheels.

Japanese Unexamined Patent Publication Nos. 49-19535, 4-8682, and 6-305456 describe a fourth type of crawler apparatus which allows simple maneuvering and facilitates replacement of the apparatus. As shown in FIG. 22, the apparatus includes a triangular crawler 370 which is mounted on the front and rear axles of a vehicle. The crawler 360 includes a drive wheel (sprocket) 371, which is mounted on an axle 360, driven wheels 372, 372, 374, which are arranged below the drive wheel 371, and a belt 376, which is wound about the wheels 371–374 forming a isosceles triangle. The drive wheel 371 transmits power to the belt 376. The driven wheels 372–374 carry the load of the vehicle.

As shown in FIG. 22, in the fourth type of crawler apparatus, the driven wheels 372–374, a plate 375, and the belt 376 pivot freely about the axle 360. The plate 375 supports the wheels 372–374. When the crawler 370 moves over ridges, stones, stumps, or the like, and the inertial force of the vehicle is great, the crawler 370 may pivot about the front driven wheel 372, as shown by the broken lines in FIG. 22, if the wheel 372 collides against obstacles. This is due to the downward forces W1, W2 acting equally from the front and rear driven wheels 372, 373 and the inertial force F acting on the axis of the drive wheel 371. The large inertial force F produces moment in the crawler 370.

To prevent the crawler 370 from pivoting out of a certain range, a stopper 377 may be provided, as shown in FIG. 22. The stopper 377 is fixed to body of the vehicle and arranged encompassing the axle 360 with two arms 377a, 377b extending from the axle 360. A protrusion 378 is provided on the plate 375. As the crawler 370 including the plate 377 is pivoted about the axle 360, the protrusion 378 is abutted against the arms 377a, 377b. This restricts the pivoting of the crawler 370. When in contact with the arms 377a, 377b, the load applied to the protrusion 378 is relatively large. The load may inflict damage on the protrusion 378. Furthermore, the stopper 375 is required to be provided on the plate 377 so that the stopper 375 moves integrally with the crawler 370. This restricts the location of the stopper 375

A fifth type of a crawler apparatus is shown in FIGS. 23 and 24. As shown in FIG. 23, a triangular crawler 481 includes a drive wheel 482, pairs of axially aligned driven wheels 483, 484, pairs of axially aligned intermediate driven wheels 485, 486 arranged between the driven wheels 483, 484, and a belt 487 wound about the wheels 482–486. The belt 487 has a plurality of projections 487a arranged along its inner surface. A groove 482a is defined along the circumferential surface of the drive wheel 482. A plurality of pins 489 extend across the groove 482a. The pins 489 of the drive wheel 482 engage with the projections 487a of the belt 487 to transmit the power of the drive wheel 482 to the belt 487.

As shown in FIG. 24, each pair of driven wheels 483–486 is arranged with one wheel on the left side of the projections 487a and the right wheel on the other side. The projections 487a are guided into the space defined between each pair of wheels 483–486 and prevent the belt 487 from falling off from the wheels 483–486. The drive wheel 482 includes rims 482b on each of its sides. The rims 482b define the groove 482a. The rims 482b support and apply sufficient tension to the belt 487. The groove 482a of the drive wheel 482 receives the projections 487a of the belt 487 to prevent the belt 487 from falling off. A bracket 488a of a frame 488 is arranged between each pair of intermediate driven wheels 485, 486 to support the wheels 485, 486.

The triangular shape of the crawler 481 increases the contact space between the crawler 481 and the surface of the terrain. This ensures the traction of the crawler 481. However, the crawler 481 may be pivoted about the axis of the drive wheel 482 when it collides against obstacles as the vehicle advances. This may result in displacement of the crawler 481. To cope with this, a pivot prevention stopper may be provided in the vehicle.

It is preferable that triangular crawlers be flattened to lower their center of gravity. This suppresses the pivoting of the crawler when it collides against obstacles. To flatten the crawler, the diameter of the drive wheel and the driven wheels (particularly, the intermediate driven wheels) may be reduced. However, the ratio of the engine speed with respect to the vehicle velocity is substantially proportional to the diameter of the drive wheel. Therefore, reducing the diameter of the drive wheel to flatten the crawler results in a decrease in the maximum speed of the vehicle. Accordingly, it is required that the engine of a vehicle that employs triangular crawlers be driven at a higher speed than that of a vehicle that employs ordinary wheels to obtain the same vehicle velocity. This increases fuel consumption. If the diameter of the intermediate driven wheels is minimized, the engaging ratio of the belt with respect to each wheel decreases. This tends to result in the belt falling off the driven wheels.

To solve these problems, the drive wheel may be arranged near the driven wheels. Japanese Unexamined Patent Publication No. 4-8682 describes a triangular crawler having a drive wheel and driven wheels that are overlapped with one another. This structure flattens the crawler without reducing the diameter of the drive and driven wheels. Holes are provided throughout the belt so as to enable the drive wheel to become engaged with the holes. A small space is provided between the pair of axially aligned intermediate driven wheels. The drive wheel, the width of which corresponds to the space, is inserted into the space. This structure prevents the belt from falling off from the drive wheel.

However, the fifth type of crawler apparatus illustrated in FIGS. 23 and 24 employs a structure in which the drive wheel 482 engages the projections 487a of the belt 487. Thus, the thickness of the rims 482b become insufficient when reducing the thickness of the drive wheel 482. Accordingly, this structure hinders the smooth guiding of the projections 487a of the belt 487 into the driven wheel 482 and results in the belt 487 tending to fall off from the drive wheel 482. Therefore, although the structure described in Patent Publication No. 4-8682 flattens the crawler without reducing the diameter of the wheels, this structure necessitates steel cores to be embedded in the belt to increase its strength. This increases the number of steps required to manufacture the belt. Furthermore, as the vehicle advances, the impact between the steel cores and the ground surface increases the noise and vibrations produced by the belt.

SUMMARY OF THE INVENTION

Accordingly, it is a primary objective of the present invention to provide a crawler apparatus having a structure in which the projections of the belt engage with the drive wheel to transmit the rotating force of the wheel to the belt and wherein the crawler may be flattened without reducing the diameter of the drive and driven wheels.

Another objective of the present invention is to provide a vehicle crawler apparatus that effectively prevents the belt from falling off from the driven wheels.

A further objective of the present invention is to provide a vehicle crawler apparatus that reduces the force acting on the stopper, which prevents the tilting of the crawler and restricts the tilting of the crawler about its drive wheel.

To achieve the foregoing and other objects and in accordance with the purpose of the present invention, a crawler apparatus for a vehicle is provided. The vehicle has at least one drive shaft. The apparatus comprises a drive wheel arranged to connect to the drive shaft, a pair of driven wheels each supported below the drive wheel by a shaft, one of the driven wheels being spaced from the other in the travelling direction of the vehicle, at least one intermediate driven wheel supported by a shaft between said driven wheels, a belt wound about the drive wheel, the driven wheels and the intermediate driven wheel. The drive wheel drives the belt. The apparatus comprises a frame for supporting said drive wheel, a subframe for supporting said intermediate driven wheel. The subframe is located below said drive wheel and is swingably attached to said frame, and wherein said drive wheel is located in a position such that it overlaps with the intermediate driven wheel from a lateral viewpoint.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of a crawler apparatus according to the present invention will hereafter be described with reference to the drawings.

Figure 1:
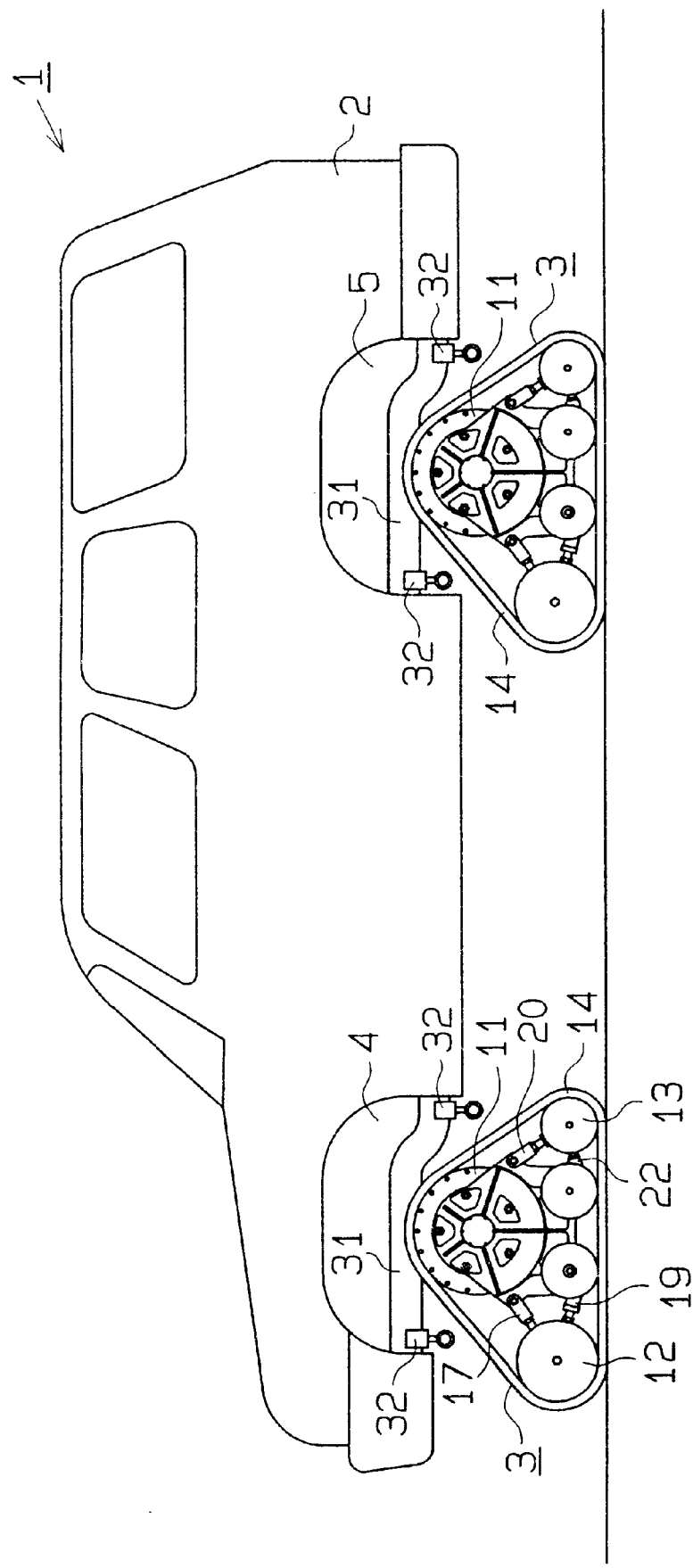
FIG. 1 is a side view showing crawler apparatuses, which are mounted on a crawler vehicle, according to a first embodiment of the present invention.

As shown in FIG. 1, a crawler vehicle 1 has triangular crawlers 3 that are mounted on its body 2. The crawlers 3 are mounted on the left and right sides of the vehicle 1 in front and rear wheel recesses 4, 5.

Figure 2:
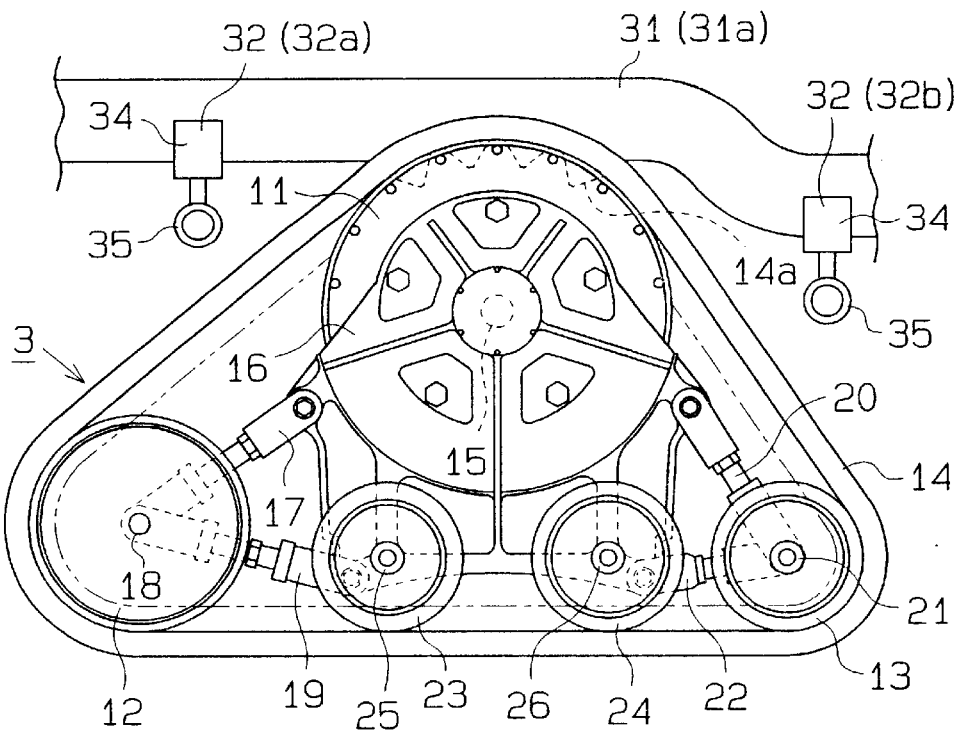
FIG. 2 is a side view showing a crawler.

As shown in FIG. 2, each crawler 3 includes a drive wheel 11, a pair of axially aligned first driven wheels 12, a pair of axially aligned second driven wheels 13, and an endless rubber belt 14. The belt 14 is wound about the wheels 11–13 and defines a triangle having three sides, the lengths of which are unequal. Projections 14a project from the inner surface of the belt 14 with a predetermined pitch between one another. The driving force of the drive wheel 11 is transmitted to the belt 14 by the projections 14a.

The drive wheel 11 is coupled to a shaft 15. The shaft 15 is coupled to an axle that is connected to an engine (both of which are not shown). The engine drives the axle and integrally rotates the shaft 15 and the drive wheel 11. A frame 16 is coupled to the shaft 15 with a bearing (not shown) provided therebetween so as to allow relative rotation of the frame 16 with respect to the shaft 15.

The front side of the frame 16 is supported by the first wheel 12 by way of a first link 17. The distal end of the first link 17 is rotatably connected to a shaft 18, which supports the wheel 12. The lower front side of the frame 16 is also connected to the shaft 18 by way of a second link 19.

The rear side of the frame 16 is supported by the second wheel 13 by way of a third link 20. The distal end of the third link 20 is rotatably connected to a shaft 21, which supports the wheel 13. The diameter of the second wheel 13 is smaller than that of the first wheel 12. The lower rear side of the frame 16 is also connected to the shaft 21 by way of a fourth link 22.

Intermediate driven wheels 23, 24, the diameters of which are equal to the diameter of the second wheel 13, are arranged between the first and second wheels 12, 13 at the lower section of the frame 16. The intermediate wheels 23, 24 rotate about shafts 25, 26, respectively. Each shaft 25, 26 is secured to the frame 16.

The belt 14 is wound about the wheels 11, 12, 13, 23, 24. Each crawler 3 is mounted in the associated wheel recess 4, 5 so that its front side (the side of the first wheel 12) is arranged at the front side of the body 2.

The drive wheel 11 is rotated to drive the belt 14 by transmitting the drive force of the wheel 11 to the projections 14a. Counterclockwise rotation of the drive wheel 11 moves the crawler 3 to the left, as viewed in FIG. 1, and moves the crawler vehicle 1 in a forward direction. Clockwise rotation of the drive wheel 11 moves the crawler 3 to the right, as viewed in FIG. 1, and moves the crawler vehicle 1 in a rearward direction.

As shown in FIG. 1, a side frame 31 extends longitudinally along the bottom of the body 2 on each side of the vehicle 1. Each side frame 31 is exposed in the wheel recesses 4, 5. The side frame 31 is made of a pillar-like pipe material, which has a rectangular cross-section. Stopper units 32 are coupled to the side frame 31 to restrict the pivoting (tilting) of the crawler 3.

Figure 3:
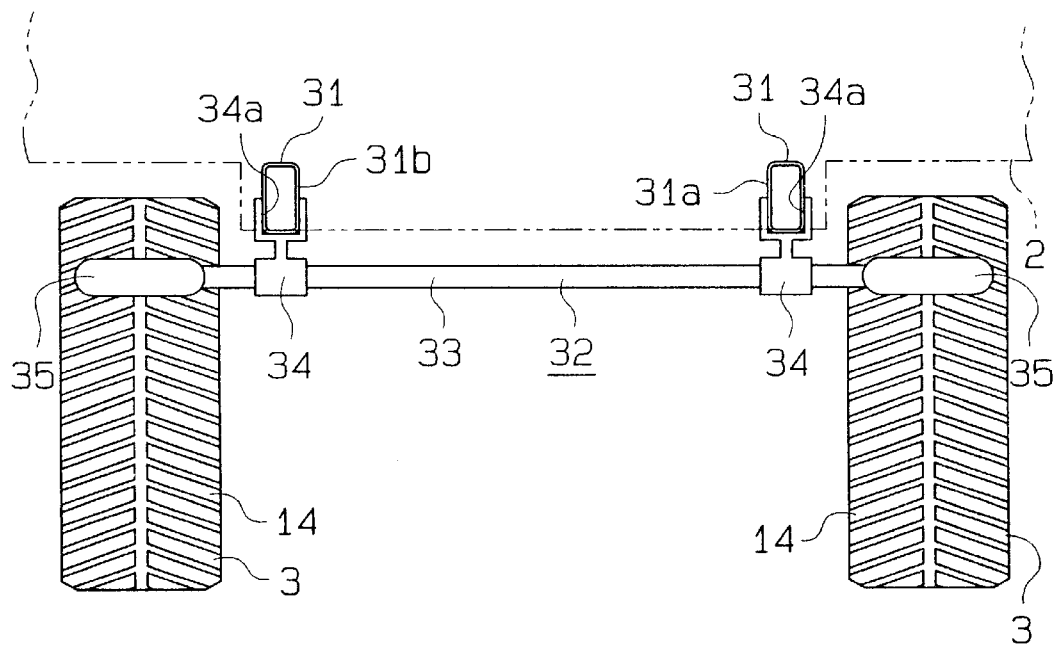
FIG. 3 is a front view showing a stopper unit.
Figure 4:
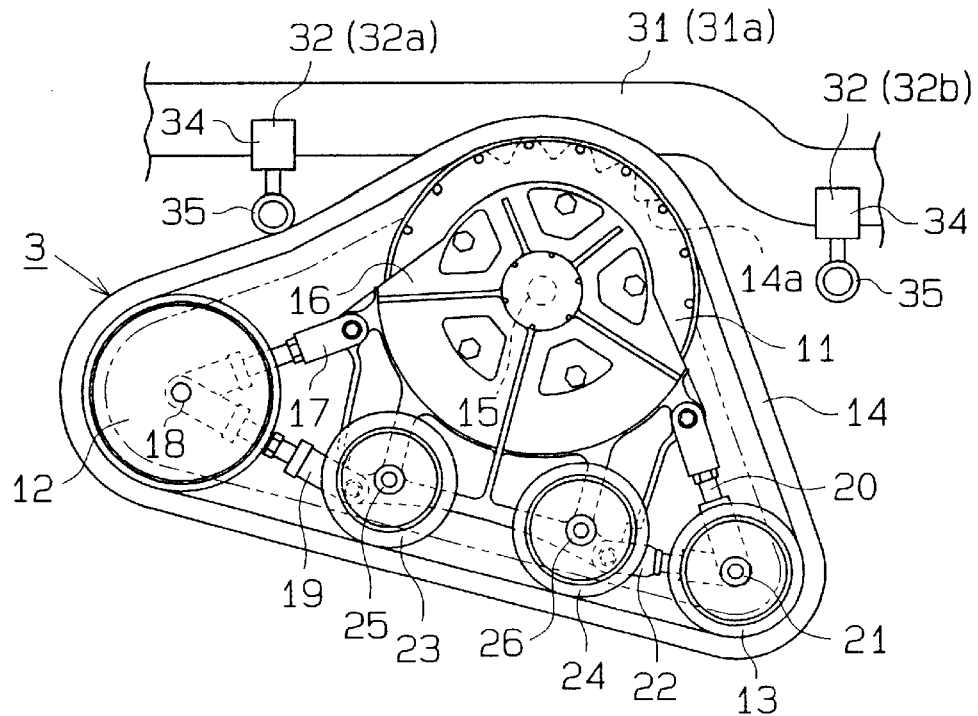
FIG. 4 is a side view showing the front side of the crawler tilted upward.
Figure 5:
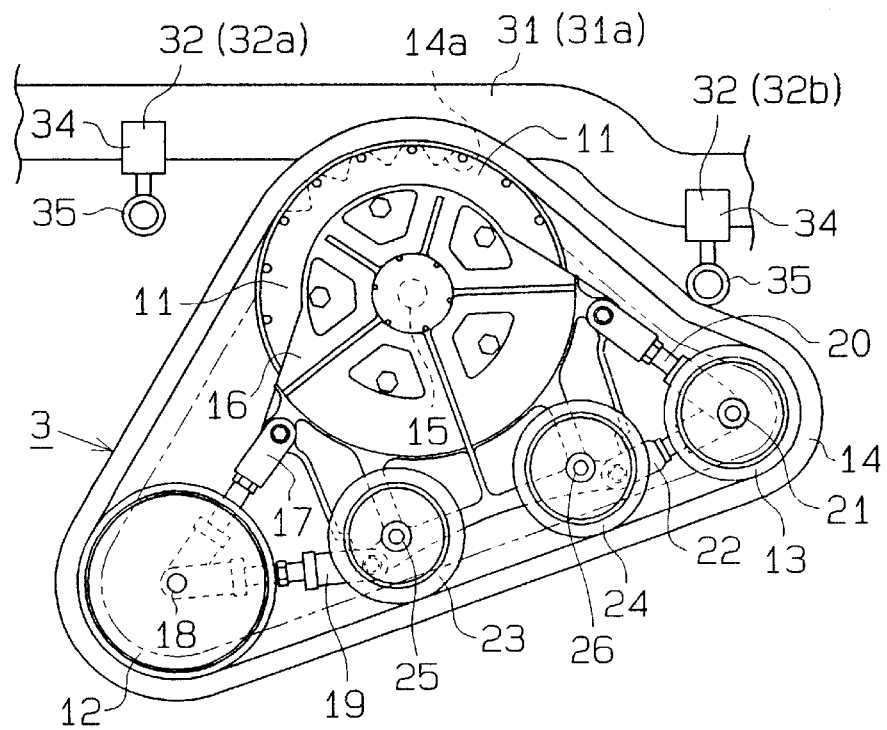
FIG. 5 is a side view showing the rear side of the crawler tilted upward.

As shown in FIG. 3, each stopper unit 32 includes a cylindrical stopper bar 33, a pair of brackets 34, and a pair of rollers 35. The brackets 34 are provided on the stopper bar 33 at locations corresponding to the left and right side frames 31a, 31b. The brackets 34 have a U-shaped cross-section that corresponds to the shape of the side frames 31. The side frames 31 are fit into an opening 34a of the brackets 34. Each bracket 34 is welded to the associated side frame 31.

The rollers 35, which are cylindrical and made of a synthetic resin, are fit onto the ends of the stopper bar 33. A bearing (not shown) is arranged between each roller 35 and the stopper bar 33 to allow the rollers 35 to rotate about the stopper bar 33. A seal (not shown) seals the space defined between each roller 35 and the stopper bar 33 to prevent foreign material, such as sand or dirt, from entering therein.

Each stopper unit 32 extends between the left and right front wheel recesses 4 and the left and right rear wheel recesses 5. The left roller 35 of each stopper unit 32 restricts the tilting of the associated left crawler 3 and the right roller 35 of each stopper unit 32 restricts the tilting of the associated right crawler 3.

As shown in FIG. 1, in this embodiment, each crawler is arranged between the two stopper units 32 that are located on each wheel recess 4, 5. The stopper bars 33 of the two stopper units 32 are parallel to each other. As shown in FIG.

2, the roller 35 of the stopper unit 32 arranged at the front side of the crawler 3 is located between the drive wheel 11 and the first wheel 12. The roller 35 of the stopper unit 32 arranged at the rear side of the crawler 3 is located between the drive wheel 11 and the second wheel 13.

The operation and advantageous effects of the stopper unit 32 employed in the first embodiment will now be described.

As shown in FIG. 1, the crawlers 3 are driven to move the crawler vehicle 1. When traveling along flat terrain, the rotation of the axles rotates the drive wheels 11. This, in turn, rotates the belts 14 and moves the vehicle 1 along the surface.

When the vehicle 1 travels along rough terrain, the crawlers 3 tilt about the axle, or the shaft 15, in accordance with the ridges and gulleys on the surface of the terrain. As the tilting of the crawlers 3 reaches a predetermined angle, the belt 14 abuts against the roller 35. This restricts the tilting.

When each crawler 3 moves over ridges defined in the surface of the terrain as the vehicle 1 advances, the crawler 3 is tilted about the shaft 15 in a frontward (clockwise, as viewed in FIG. 2) direction with the first wheel 12 displaced upward. If the ridge is large, the frontward tilting of the crawler 3 may exceed a predetermined angle. This causes the belt 14 to be abutted against the roller 35 of the front stopper unit 32a. Accordingly, the frontward tilting of the crawler 3 is mechanically restricted by the roller 35. This prevents further tilting of the crawler 3.

When each crawler 3 falls into gulleys defined in the surface of the terrain as the vehicle 1 advances, the crawler 3 is tilted about the shaft 15 in a rearward (counterclockwise) direction with the first wheel 12 displaced downward. If the gulley is deep, the rearward tilting of the crawler 3 may exceed a predetermined angle. This causes the belt 14 to be abutted against the roller 35 of the rear stopper unit 32b. Accordingly, the rearward tilting of the crawler 3 is mechanically restricted by the roller 35. This prevents further tilting of the crawler 3.

In this embodiment, the crawlers 3 tilt in frontward and rearward directions. When the tilting of each crawler 3 exceeds a predetermined angle, the outer surface of the belt 14 is abutted against the associated roller 35. Accordingly, this ensures restriction of the tilting of the crawler 3 and prevents the crawler 3 from being further pivoted. Furthermore, the rollers 35 being arranged at the front and the rear side of each crawler 3 enable restriction of both frontward and rearward tilting of the crawlers 3.

The belt 14 of each crawler 3 is made of an elastic material, such as rubber. The belt 14 is thus flexibly bent when abutted against associated roller 35. As a result, this reduces the impact caused when the belt 14 abuts against the roller 35.

The rollers 35 (stopper unit 32) are arranged at the outer side of each crawler 3. Therefore, the location of the rollers 35 is not restricted in comparison with the stoppers in the prior art. In addition, the location of contact between the roller 35 and the crawler 3 is separated from the tilting axis of the crawler 3. This reduces the magnitude of the force that acts on the rollers 35.

Each roller 35 is rotatable with respect to the associated stopper bar 33. The rollers 35 therefore follow the rotation of the belt 14 and are rotated when in contact with the belt 14. This enables smooth rotation of the belt 14. The tilting of each crawler 3 is restricted by the abutment between the belt 14 and the associated roller 35. Furthermore, the rotation of the rollers 35 reduces the rotating force of the associated belt 14 and prevents torsion from being produced in the stopper bar 33.

The rollers 35 are attached to the ends of the stopper bar 33. This structure enables the rollers 35 to be arranged at positions that restrict the tilting of the left and right crawlers 3 by extending each stopper bar 33 between the left and right front wheel recesses 4 and between the left and right rear wheel recesses 5. Hence, the installing of each stopper unit 32 is facilitated. Furthermore, the stopper units 32 are mainly constituted by attaching rollers 35 to the ends of the stopper bar 33. The structure of the stopper unit 32 is thus simple. The force applied to the rollers 35 by the belt 14 is received by the entire stopper bar 33. This enhances the strength of the stopper unit 32.

The space defined between the roller 35 and the stopper bar 33 is sealed to prevent sand and dirt from entering therein. This maintains the rollers 35 in a state allowing smooth rotation with respect to the associated stopper bar 33.

The stopper bars 33 in the wheel recesses 4, 5 are located at positions that are sufficiently distanced from the surface of the terrain. Therefore, objects such as rocks are kept away from the stopper bars 33 even when the vehicle 1 travels along rough terrain. This protects the stopper bars 33 from damage.

A second embodiment of a crawler apparatus according to the present invention will hereafter be described with reference to FIG. 6. This embodiment is a modification of the first embodiment. Parts that are identical to parts employed in the first embodiment will be denoted with the same numerals.

Figure 6:
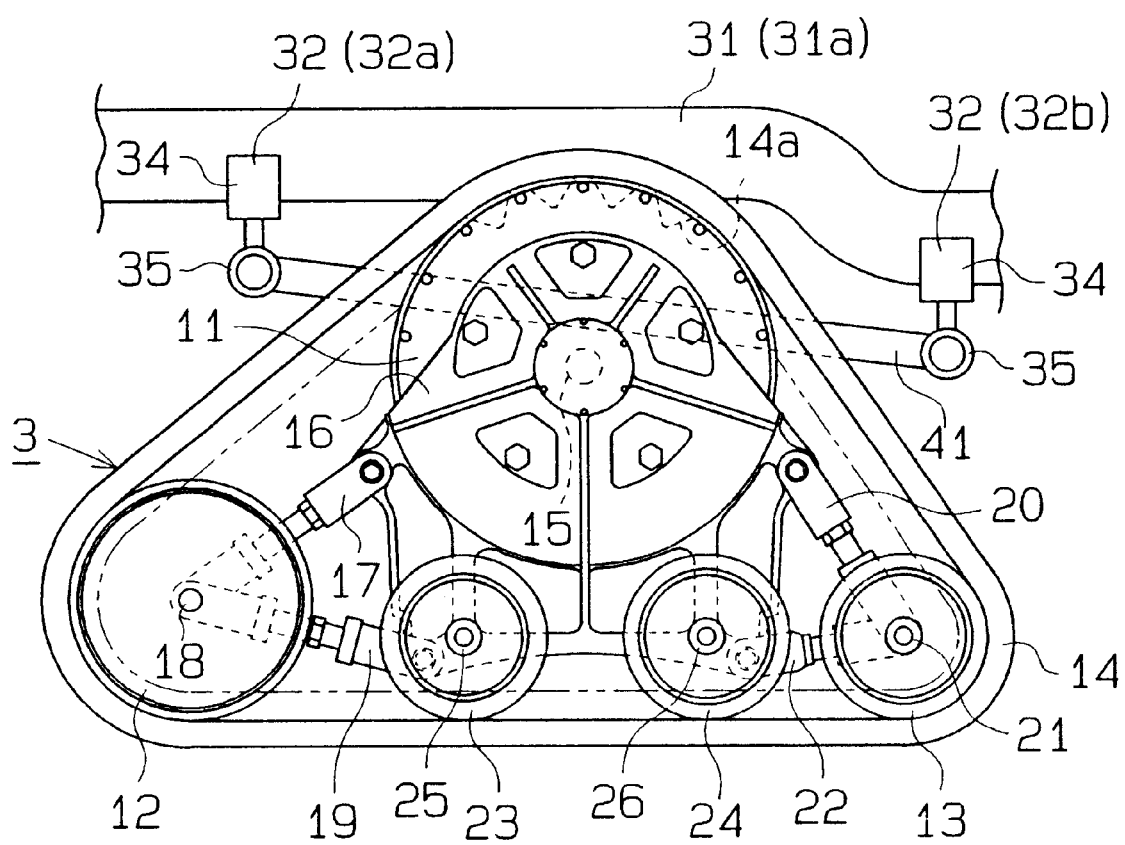
FIG. 6 is a side view showing the stopper unit of a crawler apparatus employed in a second embodiment according to the present invention.

As shown in FIG. 6, the front and rear stopper units 32a, 32b that are arranged above each crawler 3 are connected to each other by a reinforcing bar 41. Accordingly, the strength and rigidity of the stopper units 32a, 32b is improved. This enables the stopper units 32a, 32b to firmly restrict the tilting of the associated crawler 3 when contacted by the crawler 3. Thus, the tilting of the crawlers 3 is restricted more stably in comparison with the first embodiment.

A third embodiment of a crawler apparatus according to the present invention will hereafter be described with reference to the drawings.

Figure 17:
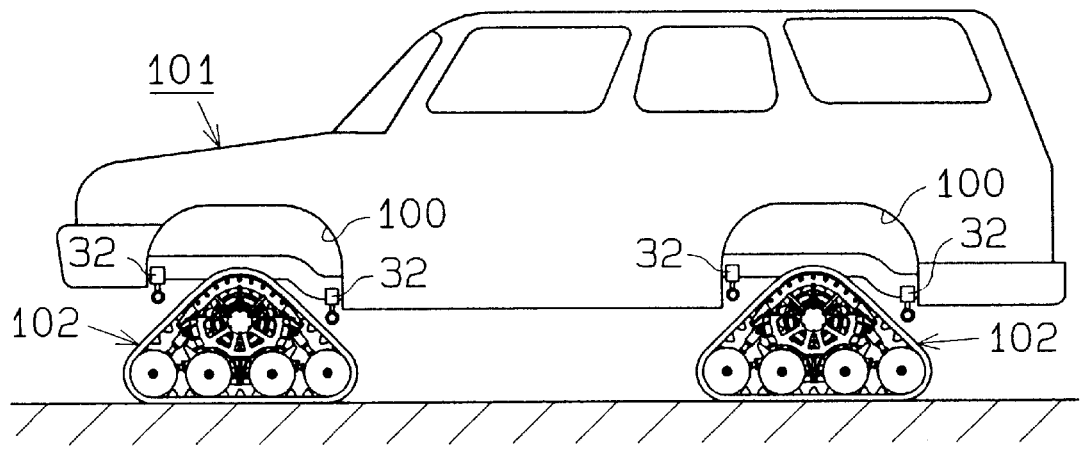
FIG. 17 is a side view showing a crawler vehicle.

As shown in FIG. 17, triangular crawlers 102 may replace the ordinary wheels of a four-wheel drive type vehicle 101. The crawlers 102, which are mounted on the vehicle in the left and right front wheel recesses and in the left and right rear wheel recesses, have identical structures.

Figure 8:
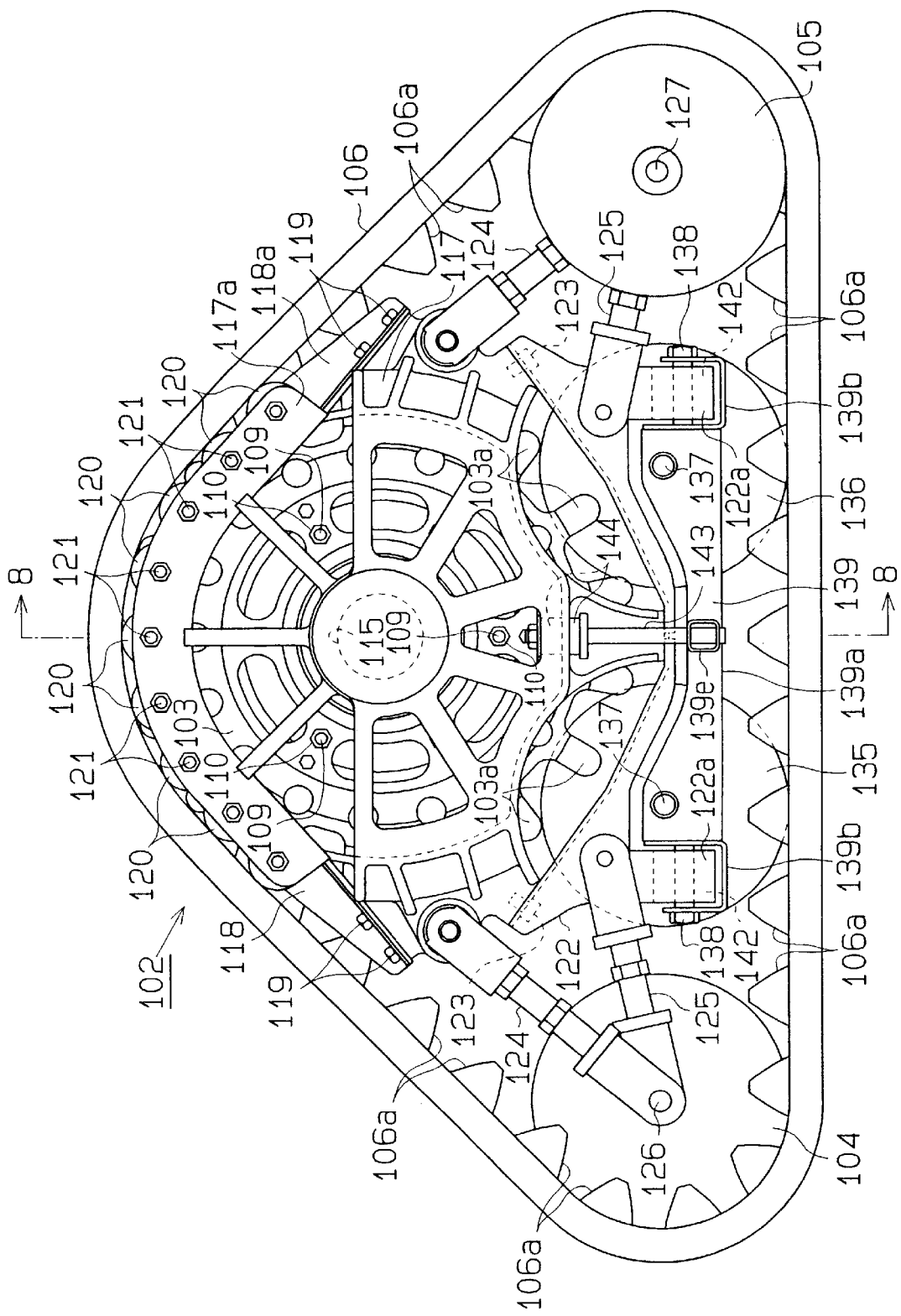
FIG. 8 is s side view showing a crawler.

As shown in FIG. 8, each crawler 102 includes a driving wheel 103, which is a sprocket, a pair of axially aligned first driven wheels (front driven wheel) 104, a pair of axially aligned second driven wheels (rear driven wheel) 105, and a rubber belt 106. The belt 106 wound about the wheels 103–106 defines a triangular shape.

Figure 7:
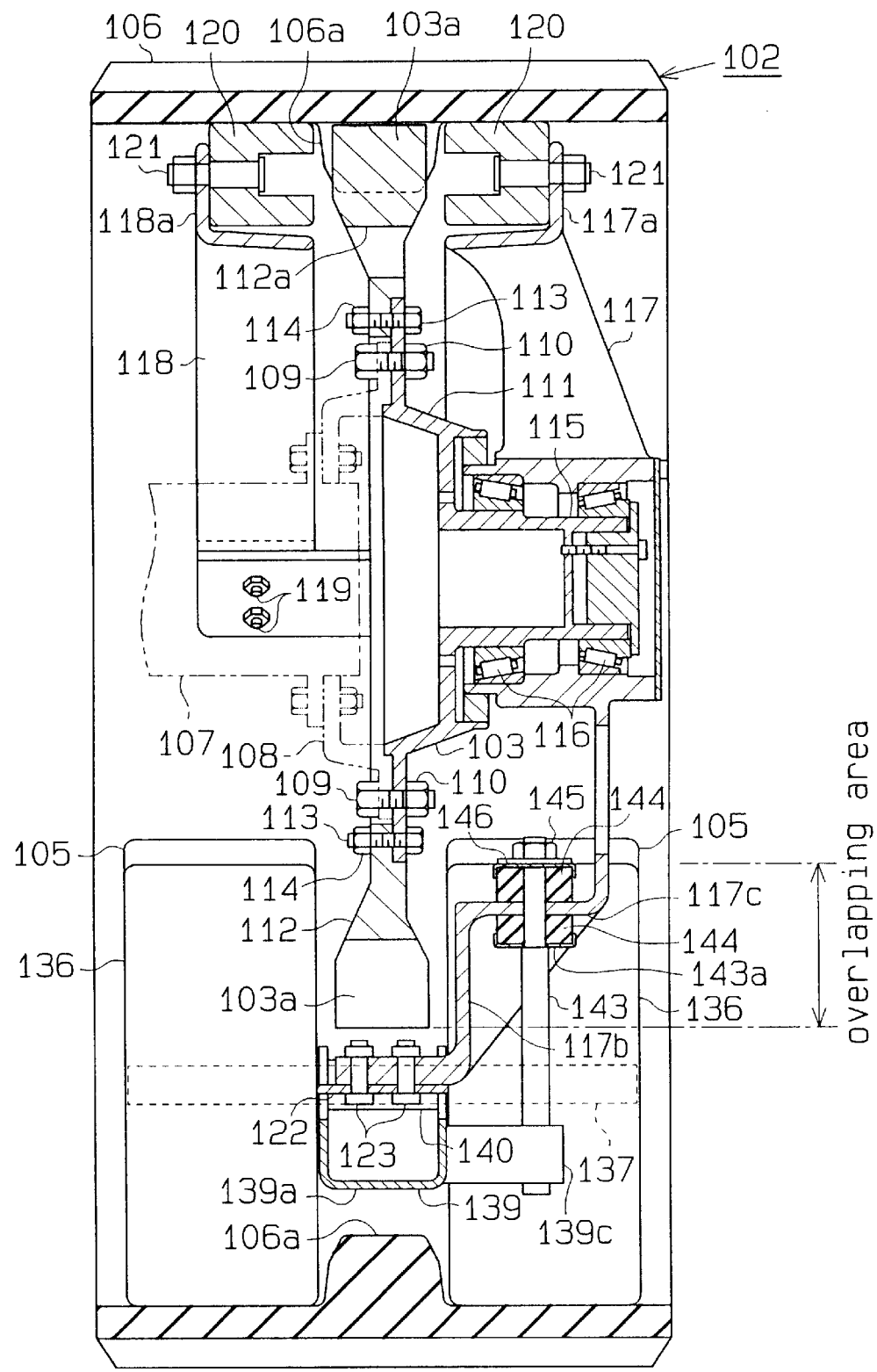
FIG. 7 is a cross-sectional view showing a crawler according to a third embodiment of the present invention taken along line 8—8 in FIG. 8.

Projections 106a project along the inner surface of the belt 106 with a predetermined interval between one another. As shown in FIG. 7, an adapter 108 is fixed to a hub of 107 of an axle for the vehicle 101. The drive wheel 103 is coupled to the adapter 108 by a plurality of bolts 109 and nuts 110 (six of each in this embodiment). The diameter of the first wheels 104 is equal to the diameter of the second wheels 105.

Figure 9:
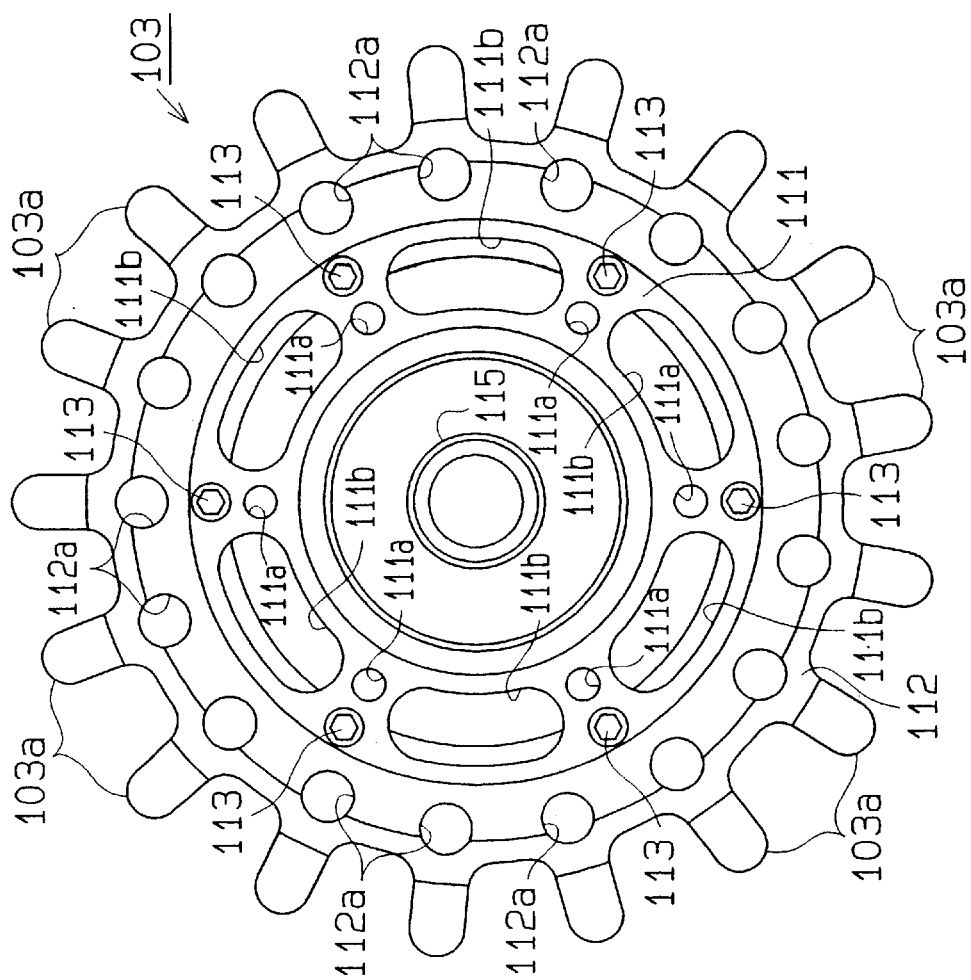
FIG. 9 is a side view showing a drive wheel.
Figure 10:
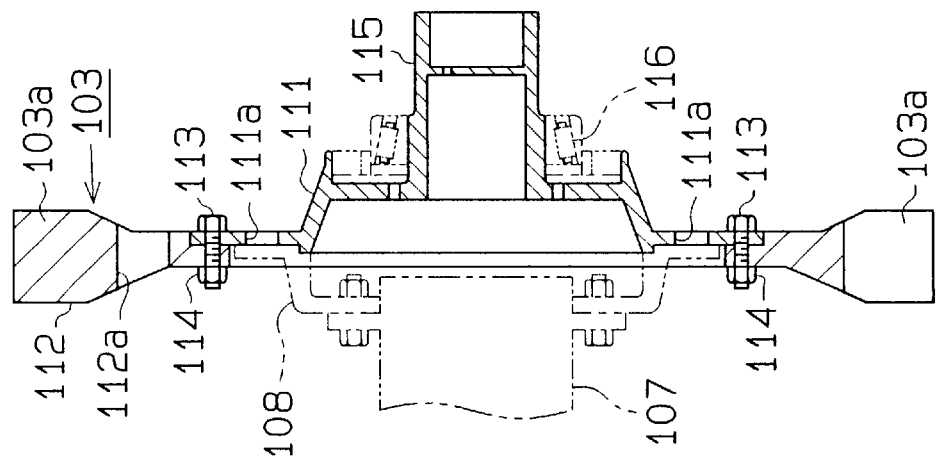
FIG. 10 is a cross-sectional front view showing the drive wheel.

As shown in FIGS. 9 and 10, the driving wheel 103 includes a disk-like rotor 111 and an annular sprocket 112. The rotor 111 constitutes the center section of the driving wheel 103 while the sprocket 112 constitutes the outer section of the wheel 103. The rotor 111 and the sprocket 112 are fastened to each other by a plurality of bolts 113 and nuts 114. The sprocket 112 is made of aluminum to minimize its weight. A plurality of teeth 103*a* project from the periphery of the drive wheel 103. The interval between each pair of adjacent teeth 103*a* corresponds to the pitch between each pair of adjacent projections 106*a*. Bolt holes 111*a* that correspond to the bolt pitch of the adapter 108 are provided in the drive wheel 103. This allows the drive wheel 103 to be compatible with ordinary wheels. A plurality of openings 111*b*, 112*a* are formed in the rotor 111 and the sprocket 112, respectively. The drive force of the drive wheel 103 is transmitted to the belt 106 by the engagement between the teeth 103*a* and the projections 106*a*.

A shaft 115 projects (normally from the plane of FIG. 8) from the center of the drive wheel 103. A bearing 116 is fit onto the shaft 115 and enables the drive wheel 103 to be rotatably supported by a main frame 117. The main frame 117 is bent so as to encompass the peripheral surface of the drive wheel 103. A guide 117*a* is arranged at the outer side of the upper section of the main frame 117. The guide 117*a* is arc-like so as to extend along a portion of the drive wheel 103. A frame 118 is arranged at the inner side of the drive wheel 103. The frame 118 has a guide 118*a* arranged at a location opposed to the guide 117*a*. The frame 118 is fastened to the main frame 117 near the ends of the guide 118*a* by bolts 119. As shown in FIG. 7, both guides 117*a*, 118*a* have an L-shaped cross-section.

As shown in FIGS. 7 and 8, nine guide rollers 120 are arranged along each guide 117*a*, 118*a* with a predetermined interval between one another. Each guide roller 120 is rotatably supported by a pin 121. As shown in FIG. 7, the guide rollers 120 abut against the lower surface of the belt 106 and support the belt 106 from each side of the driving wheel 103.

As shown in FIG. 7, a bracket 117*b* is provided at the lower middle section of the main frame 117. A stay 122 is coupled to the main frame 117 at its lower left and right ends and at the bracket 117*b* by three bolts 123. The stay 122 is curved downward in an arc-like manner to prevent interference with the drive wheel 103. The front and rear sides of the stay 122 are formed symmetrically.

Figure 11:
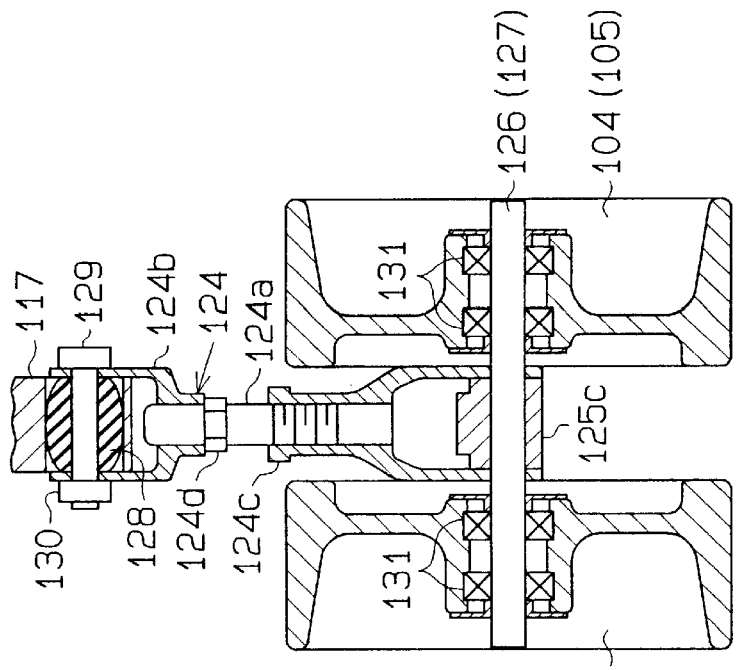
FIG. 11 is a cross-sectional view showing a first link.
Figure 12:
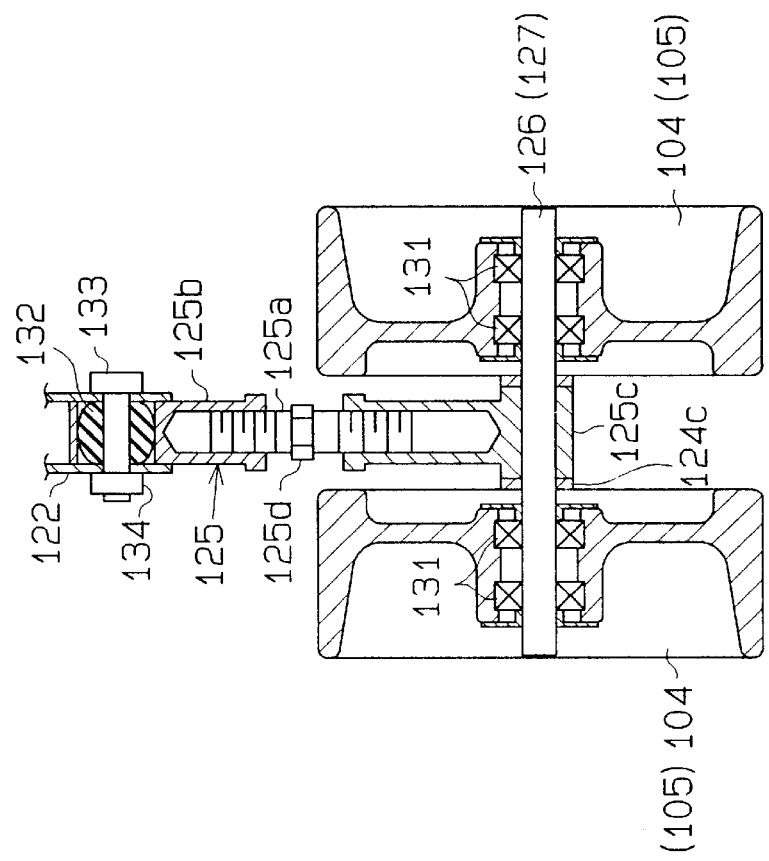
FIG. 12 is a cross-sectional view showing a second link.

As shown in FIGS. 11 and 12, the first wheels 104 are rotatably supported by a shaft 126. The shaft 126 is supported by a first link 124, by a first link 124, which is connected to the front side of the main frame 117 (left side as viewed in FIG. 8), and a second link 125, which is connected to the stay 122. The second wheels 105 are rotatably supported by a shaft 127. The shaft 127 is also supported by a first link 124, which is connected with the rear side of the main frame 117 (right side as viewed in FIG. 8), and a second link 125, which is connected with the stay 122. The supporting structure of the first wheels 104 is the same as the supporting structure of the second wheels 105. Each set of wheels 104, 105 are supported by the first and second links 124, 125.

As shown in FIG. 11, the first link 124 includes a rod 124*a*, a lower end of which is threaded, a bracket 124*b*, which is rotatably fit onto an upper end of the rod 124*a*, and another bracket 124*c*, which is screwed onto the threaded end of the rod 124*a*. This structure enables the length of the first link 124 to be adjusted. The upper end of the bracket 124*b* is coupled to the main frame 117 by a rubber bushing 128, a bolt 129, and a nut 130. The lower end of the bracket 124*c* is connected to the shaft 126, with the shaft 126 extending horizontally therein so that the axis of the rod 124*a* extends perpendicularly to the shaft 126. The wheels 104 are supported on each side of the shaft 126 with a bearing 131 fit between each wheel 104 and the shaft 126 to enable rotation of the wheels 104.

As shown in FIG. 12, the second link 125 includes a rod 125*a*, the ends of which are threaded in opposite directions, a bracket 125*b*, which is screwed onto the upper end of the rod 125*a*, and a bracket 125*c*, which is screwed onto the lower end of the rod 125*a*. This structure enables the length of the second link 125 to be adjusted. The upper end of the bracket 125*b* is coupled to the stay 122 by a rubber bushing 132, a bolt 133, and a nut 134. The lower end of the bracket 125*c* is connected to the shaft 126 in a manner enabling relative rotation between the bracket 125*c* and the shaft 126. Hexagonal nuts 124*d*, 125*d* are provided on the rods 124*a*, 125*a* of the links 124, 125, respectively, to facilitate rotation of the rods 124*a*, 125 with a spanner.

As shown in FIG. 8, pairs of axially aligned intermediate driven wheels 135, 136 are rotatably supported between the wheels 104, 105. The diameters of the intermediate wheels 135, 136 are slightly smaller than that of the first and second wheels 104, 105. The distance between the first wheel 104 and the front intermediate wheel 135 is equal to the distance between the second wheel 105 and the rear intermediate wheel 136. A shaft 137 projects from the sides of a sub frame 139, as shown in FIG. 7. The sub frame 139 is connected to arms 122*a*, which extend downward from the front and rear ends of the stay 122, by bolts 138. In the same manner as the stay 122, the front and rear ends of the sub frame 139 are shaped symmetrically.

A pivoting (swinging) axis (the pivoting axis of the sub frame 139) is defined by the front and rear bolts 138. The pivoting axis extends lower than the shafts 126, 127 of the driven wheels 104, 105. This causes the lower parts of the intermediate wheels 135, 136 (lower than the bolts 138) to be displaced within a smaller range than the upper parts of the wheels 135, 136 when the sub frame 139 pivots (swings) about the bolts 138 as the wheels 135, 136 follow the terrain surface. That is, the displacement of the intermediate wheels 135, 136 with respect to the belt 106 is relatively small due to this structure. The displacement becomes smaller as the bolts 138 become closer to the terrain surface. The position of the bolts 138 with respect to the terrain surface is set by adjusting the coupling position of a box beam 139*a* with respect to holders 139*b*.

Figure 13:
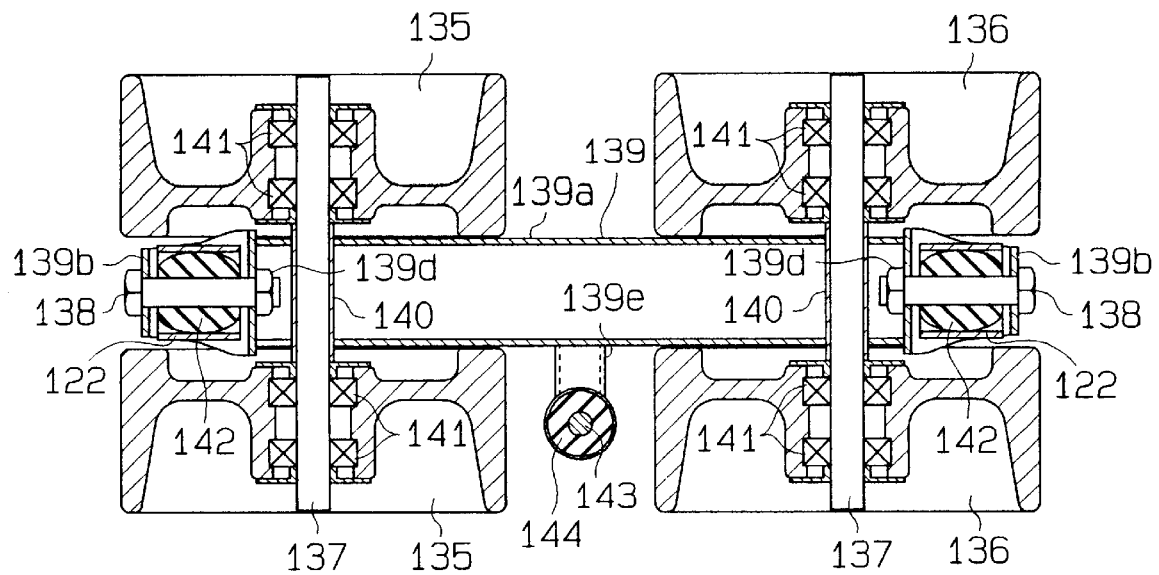
FIG. 13 is a cross-sectional top view showing the supporting structure of intermediate driven wheels.
Figure 15:
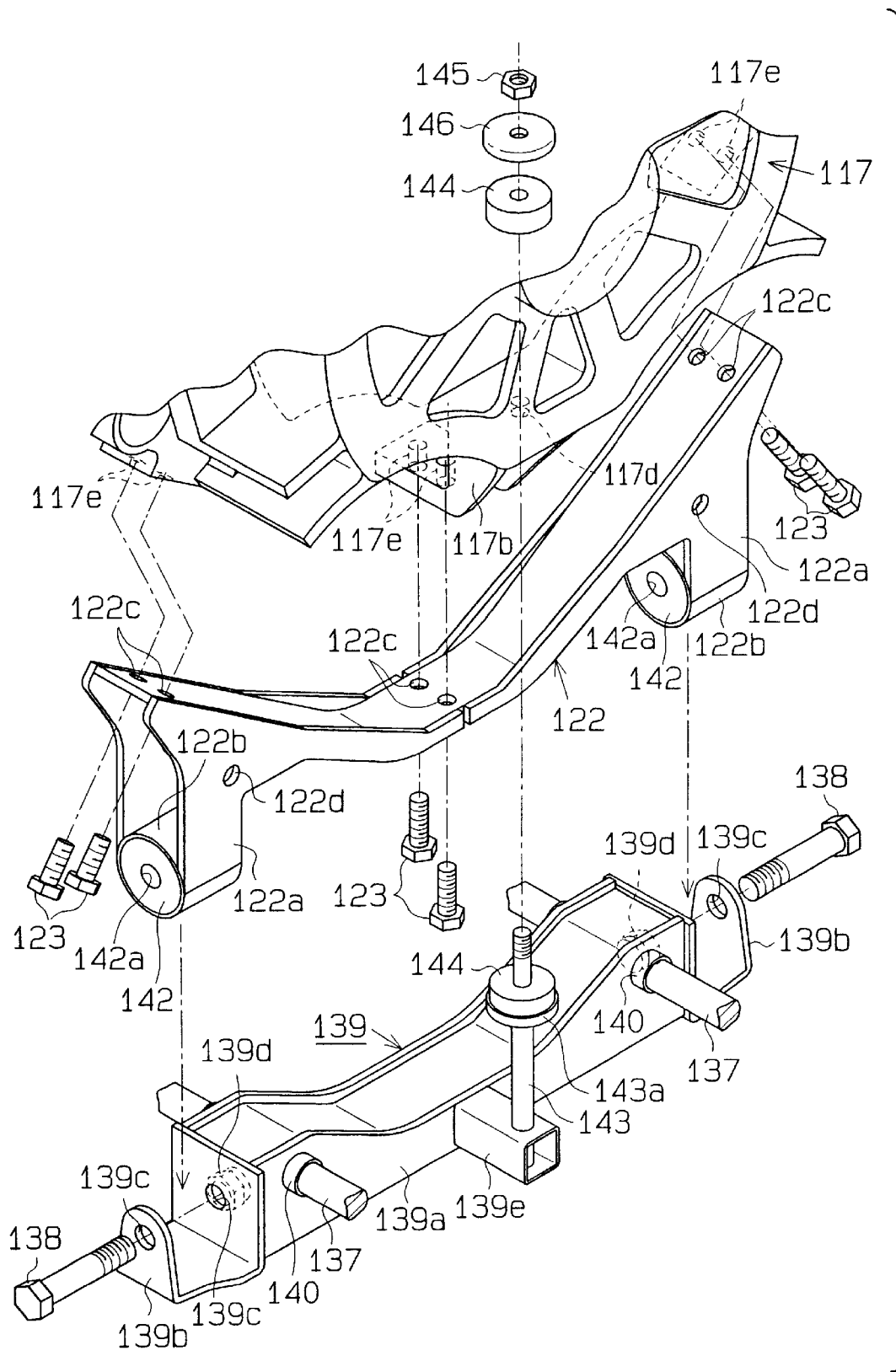
FIG. 15 is an exploded view showing the supporting structure of the intermediate driven wheels.

As shown in FIGS. 8, 13, and 15, the front and rear ends of the sub frame 139 are formed symmetrically in the same manner as the stay 122. The sub frame 139 includes the box beam 139*a*, which is curved downward so as to match the bottom surface of the stay 122, and a pair of holders 139*b* defined at the front and rear ends of the beam 139*a*. The holders 139*b* are U-shaped, as viewed in FIG. 8, so as to allow the arms 122*a* of the stay 122 to be fit therein.

As shown in FIGS. 13, 15, a pair of pipes 140 extend laterally through the front and rear ends of the beam 139*a*. A shaft 137 is inserted through each of the pipes 140. The intermediate wheels 135, 136 are supported at the ends of the associated shafts 137. A bearing 141 (FIG. 13) is arranged between each driven wheel 135, 136 and the associated shaft 137 to enable rotation of the wheels 135, 136.

Figure 14:
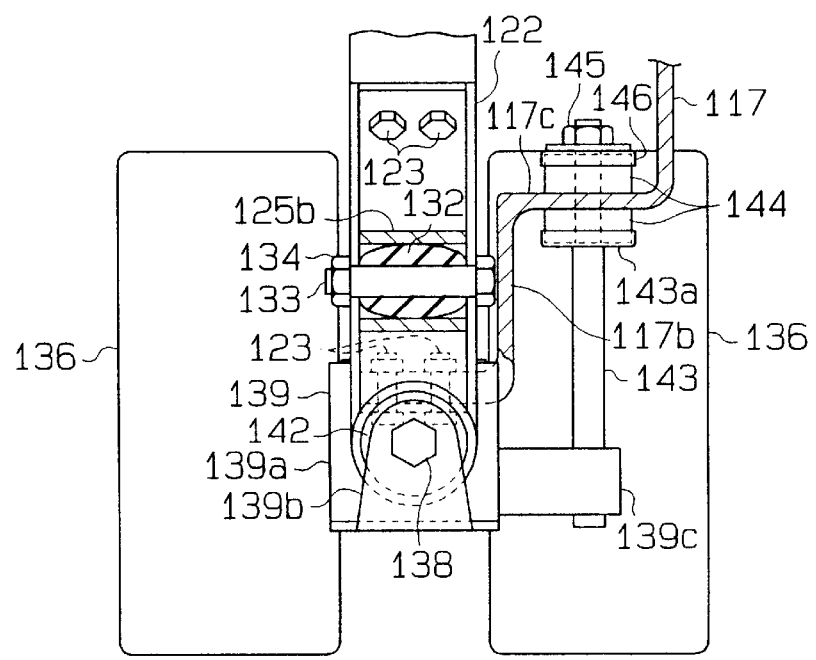
FIG. 14 is a partially cutaway front view showing the supporting structure of the intermediate driven wheels.

As shown in FIGS. 14, 15, a cylindrical pipe 122*b* is secured to each arm 122*a*. A rubber bushing 142 is arranged in each of the pipes 122*b*. Holes 139*c* are formed in each of the holders 139*b*. A hole 142*a* corresponding to the holes 142a of the associated holder 139 extends through each of the rubber bushings 142. Each arm 122a (including the pipe 142) is fit into the corresponding holder 139b. In this state, the bolts 138 are inserted through the aligned holes 139c, 142a and screwed into nuts 139d, which are secured to the beam 139a. This pivotally supports the sub frame 139 with respect to the stay 122. In other words, the sub frame 139 pivots with respect to the stay 122 (main frame 117) about the front and rear bolts 138, which extend in the moving direction of the crawler 102. In the sub frame 139, the vibrations of the intermediate wheels 135, 136 are absorbed by the resilient deformation of the associated rubber bushings 142.

The rubber bushings 142 are relatively hard (or have a large elastic coefficient) and are prevented from deforming so as to cause the axis of the bolts 138 to be displaced over a predetermined angle. The arms 122a are fit into the associated holder 122a. This structure restricts the displacement of the sub frame 139 and allows the frame 139 to be displaced only by the pivoting.

A bracket 139e projects sideward and horizontally from the middle section of the sub frame 139. As shown in FIGS. 7, 14, 15, a bent arm 117b extends from the lower middle section of the main frame 117. A step 117c, which extends horizontally, is defined in the arm 117b. A guide rod 143, which is fixed to the bracket 139e, extends in an upward direction. The rod 143 is inserted through a hole 117d, which is formed in the step 117c. The distal end of the rod 143 is fastened to the step 117c by a nut 145 with two elastic members 144, which are made of rubber, gripping the upper and lower surfaces of the step 117c.

The two elastic members 144 are clamped between a receiving plate 143a, which is fixed to the rod 143, and a receiving plate 146, through which the rod 143 is inserted. The fastening force of the nut 145 slightly compresses the elastic members 144. Since the rod 143 is supported by the main frame 117 at only one point (the hole 117d), the rod inclines with respect to the main frame 117 within a predetermined angle range with the hole 117d serving as a fulcrum. This enables the sub frame 139 to pivot about the bolts 138.

The pair of elastic members 144 urges the sub frame 139 to position the axes (the shafts 137) of the intermediate wheels 135, 136 parallel to the axis of the drive wheel 103. Thus, the shafts 137 normally extend parallel to the axis of the drive wheel 103. Accordingly, the sub frame 139 pivots about the bolts 138 against the urging force of the elastic members 144.

As shown in FIG. 15, holes 117e, 122c are formed in the main frame 117 and the stay 122, respectively. Bolts 123 are inserted through the corresponding holes 117e, 122c to hold the frame 117 and the stay 122 integrally. Holes 122d are formed in the stay 122 to allow the insertion of bolts 133, which fasten the bracket 125b of the second link 125 to the stay 122.

As shown in FIGS. 7 and 8, a portion of the drive wheel 103 of each crawler 102 is fit into the space defined between each pair of intermediate wheels 135, 136. Thus, the drive wheel 103 and the intermediate wheels 135, 136 partially overlap one another, as viewed in FIG. 8. This structure enables the crawler 102 to be flattened without minimizing the diameter of the drive wheel 103 and the intermediate wheels 135, 136. The diameter of the drive wheel 103 is about 70 percent the diameter of a normal wheel that has been replaced by the crawler 102. FIG. 8 illustrates the outer wheel removed from each pair of first wheels 104 and intermediate wheels 135, 136.

As described above, the crawlers 102 according to this embodiment are mounted on the front and rear sides of the crawler vehicle 101.

After the engine of the vehicle 101 is started, the clutch is connected to rotate each hub 107 integrally with the associated drive wheel 103. The drive force of the hub 107 is transmitted through the engagement between the teeth 103a and the projections 106a to rotate the belt 106 and thus move the vehicle 103.

In this embodiment, each crawler 102 has an overlapping structure in which a portion of the drive wheel 103 is inserted into the space defined between each pair of intermediate wheels 135, 136. This allows the crawler 102 to be flattened without minimizing the diameters of the drive wheel 103 and the intermediate wheels 135, 136. The stay 122, which is curved downward to prevent interference with the drive wheel 103, is fixed to the lower section of the main frame 117. The arms 122a of the stay 122 are fit into the associated holders 139b. This enables the sub frame 139 to be supported below the drive wheel 103 so as to extend along the radial direction of the drive wheel 103.

Since the stay 122 is curved downward to avoid interference with the drive wheel 103, sufficient overlap between the drive wheel 103 and the intermediate wheels 135, 136 is ensured. In addition, the axes of the front and rear intermediate wheels 135, 136 are offset frontward and rearward from a position directly below the axis of the drive wheel 103. The upper surface of the sub frame 139 is curved in correspondence with the stay 122. This enables the shafts 137 supported by the sub frame 139 to be arranged as high as possible. Accordingly, this allows a further increase in the overlap between the drive wheel 103 and the intermediate wheels 135, 136. In addition, since the stay 122 and the sub frame 139 are located below the drive wheel 103, the thickness of the drive wheel 103 may be widened to the full width of the space defined between each pair of aligned intermediate wheels 135, 136.

In this embodiment, the overlapping structure of the crawlers 102 limits the thickness of the drive wheel 103 to the width of the space defined between the intermediate wheels 135, 136. Therefore, the contact area between the drive wheel 103 and the belt 106 in the lateral direction is relatively small. However, as shown in FIG. 7, the belt 120 is supported by rollers 120 which are arranged on both sides of the drive wheel 103. This ensures a sufficient area of the belt 106 to be supported by the rollers 120. In the case that the belt 106 is displaced laterally, the projections 106a of the belt 106a abut against the rollers 120 and restrict further movement of the belt 106. This prevents the belt 106 from falling off from the drive wheel 103. Since the belt 106 is supported by the rollers 120, the sliding friction produced between the belt 106 and the rollers 120 is reduced to a low level. This prevents wear in the inner surface of the belt 106.

Figure 16:
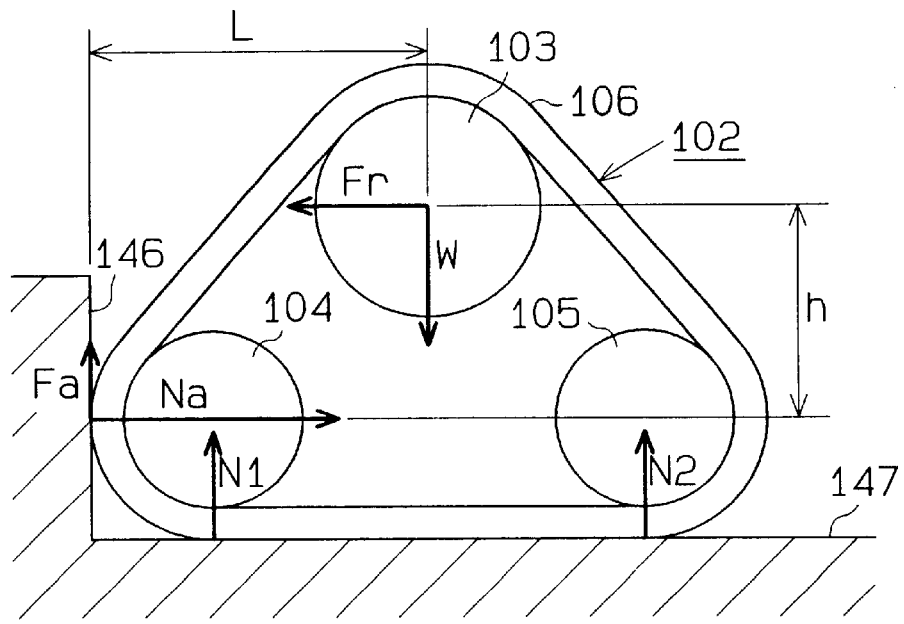
FIG. 16 is a diagrammatic view showing the forces that act on the crawler.

In this embodiment, the center of gravity of each crawler 102 is lowered when the crawlers 102 are flattened. This prevents the crawler 102 from being pivoted by obstacles on the terrain surface. The diagrammatic drawing of FIG. 16 illustrates how the tilting of each crawler 102 is prevented.

When the crawler 102 hits an obstacle 146 as it advances, a frontward propulsion Fr acts on the axis of the drive wheel 103. Furthermore, an upward drive force Fa produced by the first wheel 104 and a rearward reaction force Na acts at the point where the crawler 102 abuts against the obstacle 146. Despite the abutment between the crawler 102 and the obstacle 146, a downward axle load W acts on the axis of the drive wheel 103 while the terrain surface 147 produces vertical (upward) reaction forces N1, N2 that act on the first and second wheels 104, 105, respectively. (The vertical reaction forces acting on the intermediate wheels 135, 136 are ignored here.)

The conditions which cause pivoting, or tilting of the crawler 102 is represented by the following equation (1):

$$Na \cdot h \geq Fa \cdot L \tag{1}$$

The vertical distance between the axis of the drive wheel 103 and a line segment connecting the axes of the first and second wheels 104, 105 is represented by h. The distance between the obstacle 146 and the axis of the drive wheel 103 in the moving direction of the drive wheel 103 is represented by L. Equation (1) may be transformed as follows:

$$h/L \geq Fa/Na$$

This indicates that pivoting will not occur when the value of Fa/Na exceeds the value of h/L. In other words, pivoting is suppressed by maintaining h/L at a low value. Flattening of the crawler 102 causes a decrease in the ratio (flattening rate) h/L. Thus, the flattening of the crawler 102 suppresses pivoting of the crawler 102.

In this embodiment, the employment of the overlapping structure allows each crawler 102 to be flattened without minimizing the diameter of the drive wheel 103. Furthermore, the diameter of the drive wheel 103 is about 70 percent the diameter of the normal wheel replaced by the crawler 102. Therefore, even if the crawler 102 is flattened, the maximum speed capacity of the crawler vehicle 101 and the fuel efficiency of the engine remains unchanged. In addition, the engaging ratio of the belt 106 with respect to the intermediate wheels 135, 136 is high since the diameter of the wheels 135, 136 remains unchanged. Accordingly, the belt 106 is prevented from falling off from the wheels 135, 136.

In this embodiment, an upward force acts on the intermediate wheels 135, 136 when each crawler 102 moves over obstacles on the surface of the terrain. Movement over such obstacles causes deformation of the rubber bushings 142 and the elastic members 144 and results in an upward displacement of the sub frame 139 with respect to the stay 122. This enables the crawler 102 to move easily over obstacles, or the like. Furthermore, the rubber bushings 142 and the elastic members 144 reduce the impact produced when moving over obstacles.

In this embodiment, the inclining of the shafts 137 of the intermediate wheels 135, 136 with respect to the axis of the drive wheel 103 is restricted so as to enable the shafts 137 to correspond with the small ridges and gulleys in the terrain surface. In other words, the guide rod 144 and the deformation of the rubber bushing 142 allow inclination of the shafts 137. The inclination of the shafts 137 becomes larger as the load acting on the intermediate wheels 135, 136 becomes larger. The force which urges each shaft 137 to its original position becomes larger as the load applied to the intermediate wheels 135, 136 becomes larger. The intermediate wheels 135, 136 may be inclined laterally by force applied from the terrain surface within a range through which the belt is prevented from falling off from the wheels 135, 136. Accordingly, the movement of each crawler 102 corresponds to the small ridges and gulleys in the terrain surface.

Although not shown in the drawings, stoppers employed in the first and second embodiments are provided in the crawler vehicle 101 at positions along a path of each crawler 102 when it pivots about the shaft 115. Therefore, the pivoting of the crawler 102 is restricted by the associated stopper. In addition, the crawler 102 is prevented from being hit against the body of the vehicle 101, such as the wall of the wheel recesses, and thus the belt 106 is prevented from being damaged.

In this embodiment, the distance between the intermediate wheels 135 and the front wheel 104 is equal to the distance between the intermediate wheel 136 and the rear wheel 105. The axes of the intermediate wheels 135, 136 are offset frontward and rearward, respectively, from a position located directly below the axis of the drive wheel 103. This structure ensures a large overlapping area between the drive wheel 103 and the intermediate wheels 135, 136.

In this embodiment, the stay 122 and the sub frame 139 are arranged below the drive wheel 103. This enables the width of the teeth 103a projecting from the drive wheel 103 to be widened to the full width of the space defined between each pair of aligned intermediate wheels 135, 136. Therefore, this allows the engaging area between the drive wheel 103 and the belt 106 to be enlarged and allows the drive force of the drive wheel 103 to be efficiently transmitted to the belt 106.

In this embodiment, the sub frame 139 pivots laterally with respect to the stay 122. The rubber bushings urge the sub frame 139 so as to suppress the pivoting of the frame 139. The guide rod 144 restricts the pivoting of the sub frame 139 and prevents it from pivoting more than a predetermined angle. Therefore, the intermediate wheels 135, 136 move laterally in a flexible manner in accordance to the torsion produced by the ridges and gulleys or inclination of the terrain surface. This prevents the belt 106 from falling off the wheels 135, 136.

In this embodiment, the sub frame 139 is supported by the stay 122. The guide rod 144 enables the laterally middle section of the sub frame 139 to be supported by the main frame 117. Accordingly, the front and rear ends of the sub frame 139 move slightly in the vertical direction with the rod 144 serving as a fulcrum. Thus, the intermediate wheels 135, 136 move vertically in an alternate manner as the belt 106 becomes curved in accordance with the terrain surface. This prevents the belt 106 from falling off from the intermediate wheels.

In this embodiment, when the crawler vehicle 101 advances along a flat terrain, the intermediate wheels 135, 136 of each crawler 102 are free from lateral force. In addition, the elastic members 144 urge the sub frame 139 so as to cause the shafts 137 to be parallel to the axis of the drive wheel 103.

As the belt 106 advances over the ridges and gulleys in the terrain surface, the belt 106 vibrates the driven wheels 104, 105, 135, 136. The vibrations of the first and second wheels 104, 105 are absorbed by the rubber bushings 128, 132 connected to the first and second links 124, 125, respectively. This suppresses the magnitude of the vibrations transmitted to the main frame 117. The vibrations of the intermediate wheels 135, 136 are absorbed by the rubber bushings 142. This also suppresses the magnitude of the vibrations transmitted to the main frame 117. As a result, vibrations are not transmitted to the body of the crawler vehicle 101 when traveling along rough terrain. This improves the riding comfort of the vehicle 101.

When the crawler vehicle 101 travels along sloped surfaces, the belt 106 becomes inclined along the surface. The sloped terrain results in the belt 106 producing an external force which acts laterally (sideways) on the intermediate wheels 135, 136. The external force causes the sub frame 139 to be pivoted about the bolts 138 and allows the crawler 102 to be pivoted about an axis that is parallel to the moving direction of the vehicle 101. This enables the intermediate wheels 135, 136 to follow the lateral inclination of the belt 106. Thus, the wheels 135, 136 may be inclined laterally.

The sub frame 139 is pivoted against the urging force of the elastic members 144. When the inclined belt 106 returns to its original state (the state when moving along flat terrain), the external force applied to the intermediate wheels 135, 136 becomes small. Thus, the resilient force of the elastic members 144 causes the intermediate wheels 135, 136 to follow the belt 106 and return to its original straight state. This structure ensures sufficient contact area (engaging ratio) between the belt 106 and the intermediate wheels 135, 136 and prevents the belt 106 from falling off from the wheels 104, 105, 135, 136.

As the wheels 135, 136 return to its original state, the guide rod 143 enables the sub frame 139 to be pivoted with the hole 117c serving as a fulcrum. The bolts 138, which serve as the pivoting axis of the sub frame 139, are inserted through relatively hard rubber bushings 142. Thus, the sub frame 139 is displaced only in the pivoting direction of the sub frame 139 when an external force is applied by the belt 106. Displacement of the sub frame 139 in other directions is restricted by the abutment of the holders 139b against the arms 122a. Therefore, the rotating direction of the intermediate wheels 135, 136 is kept aligned with the rotating direction of the belt 106. Accordingly, problems such as the belt falling off from the driven wheels due to the wheels rolling in directions other than the rotating direction of the belt do not occur, as in the prior art.

In this embodiment, the bolts 138, which define the pivoting axis of the sub frame 139, are located at a position lower than the shafts 126, 127 of the driven wheels 104, 105. This maintains the lateral displacement of the sub frame 139 at a low level when the sub frame 139 pivots about the bolts 138 as the wheels 135, 136 follow the terrain surface. Therefore, the belt 106 is prevented from falling off from the intermediate wheels 135, 136.

In this embodiment, the elastic members 144, which apply resilient force to the sub frame 139 when the frame 139 is pivoted, and the rubber bushings 142, which absorb the vibrations of the intermediate wheels 135, 136, are separate members. Therefore, the elastic members 144 and the rubber bushings 142 may each be provided with an elastic coefficient that is optimum for its function. In the prior art structure illustrated in FIG. 20, the single rubber block 274 serves to apply resilient force to the wheels 272 while also serving to absorb the vibrations of the wheels 272. Therefore, the elastic coefficient of the rubber block 274 may not be optimum for both functions. Therefore, if the rubber block 274 is provided with an elastic coefficient that is optimum for either one of the functions, the other function may be sacrificed. For example, if the elastic coefficient is not appropriate for returning the inclined intermediate wheels to their original straight state, the wheels may become unstable. If the elastic coefficient is not appropriate for absorbing the vibrations of the intermediate wheels, resonance may enhance the amplitude vibration produced by the wheels. In such cases, the belt may fall off from the intermediate wheels. However, in this embodiment, the elastic coefficient that is optimum for each of the above functions are provided. Therefore, this further effectively prevents the belt 106 from falling off from the intermediate wheels 135, 136 and improves the riding comfort of the crawler vehicle 101.

Figure 20:
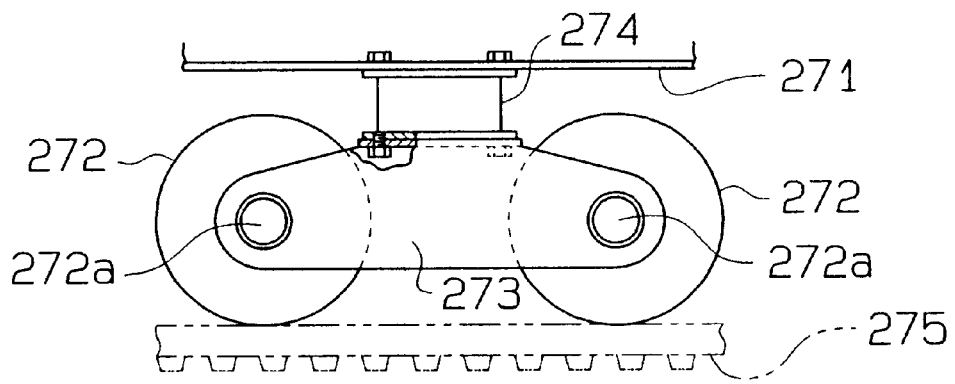
FIG. 20 is a side view partially showing the prior art crawler apparatus.
Figure 21:
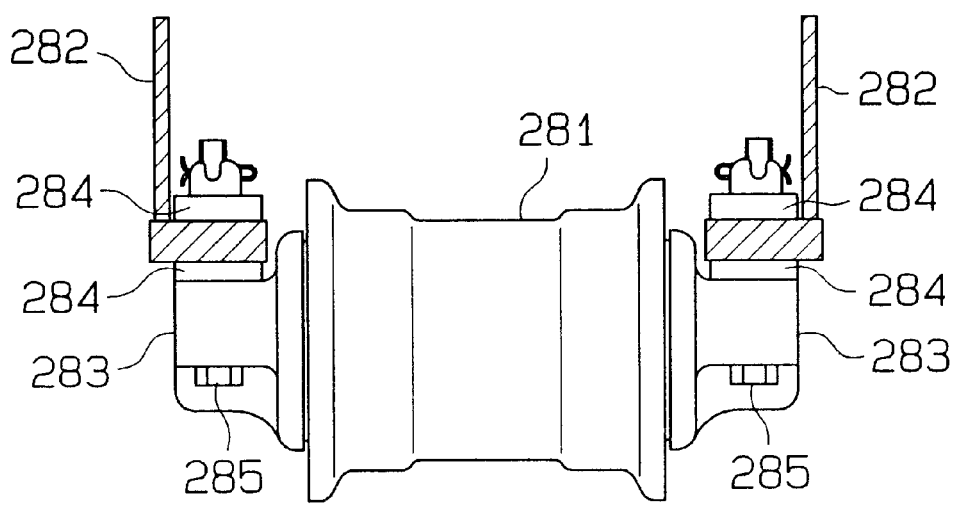
FIG. 21 is a cross-sectional front view partially showing the prior art crawler.
Figure 22:
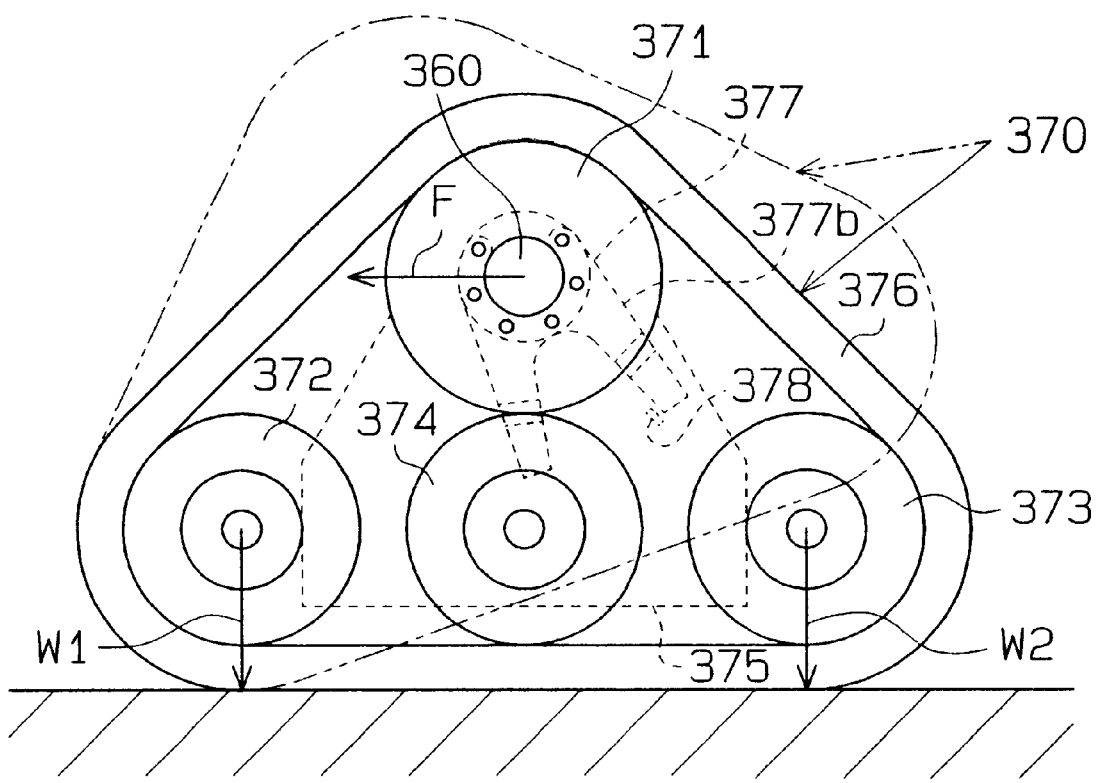
FIG. 22 is a side view showing the prior art crawler.
Figure 23:
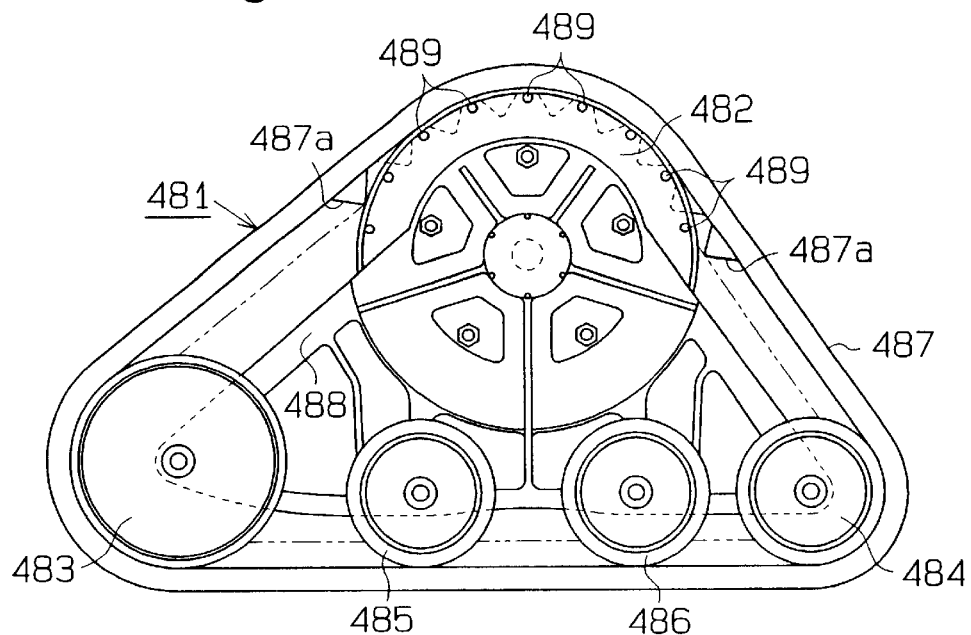
FIG. 23 is a side view showing the prior art crawler.
Figure 24:
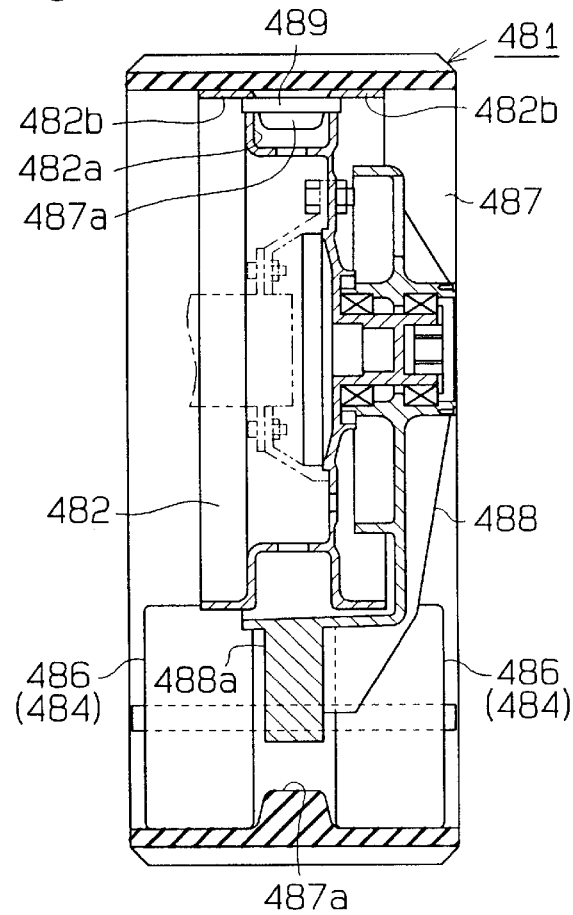
FIG. 24 is a cross-sectional front view showing the prior art crawler.

In the prior art crawler illustrated in FIG. 20, the driven wheels may be laterally inclined as they follow the inclination of the belt. However, deformation of the rubber block 274 changes its elastic characteristic. Therefore, the vibration absorbing characteristic differs when the driven wheels 272 are in the normal straight state from when the wheels 272 are in an inclined state. However, the structure of this embodiment enables the vibration absorbing characteristic to be the same when the wheels are straight and when inclined.

A fourth embodiment of a crawler apparatus according to the present invention will hereafter be described with reference to the drawings. In this embodiment, the supporting structure of the driven wheels differs from the third embodiment.

Figure 18:
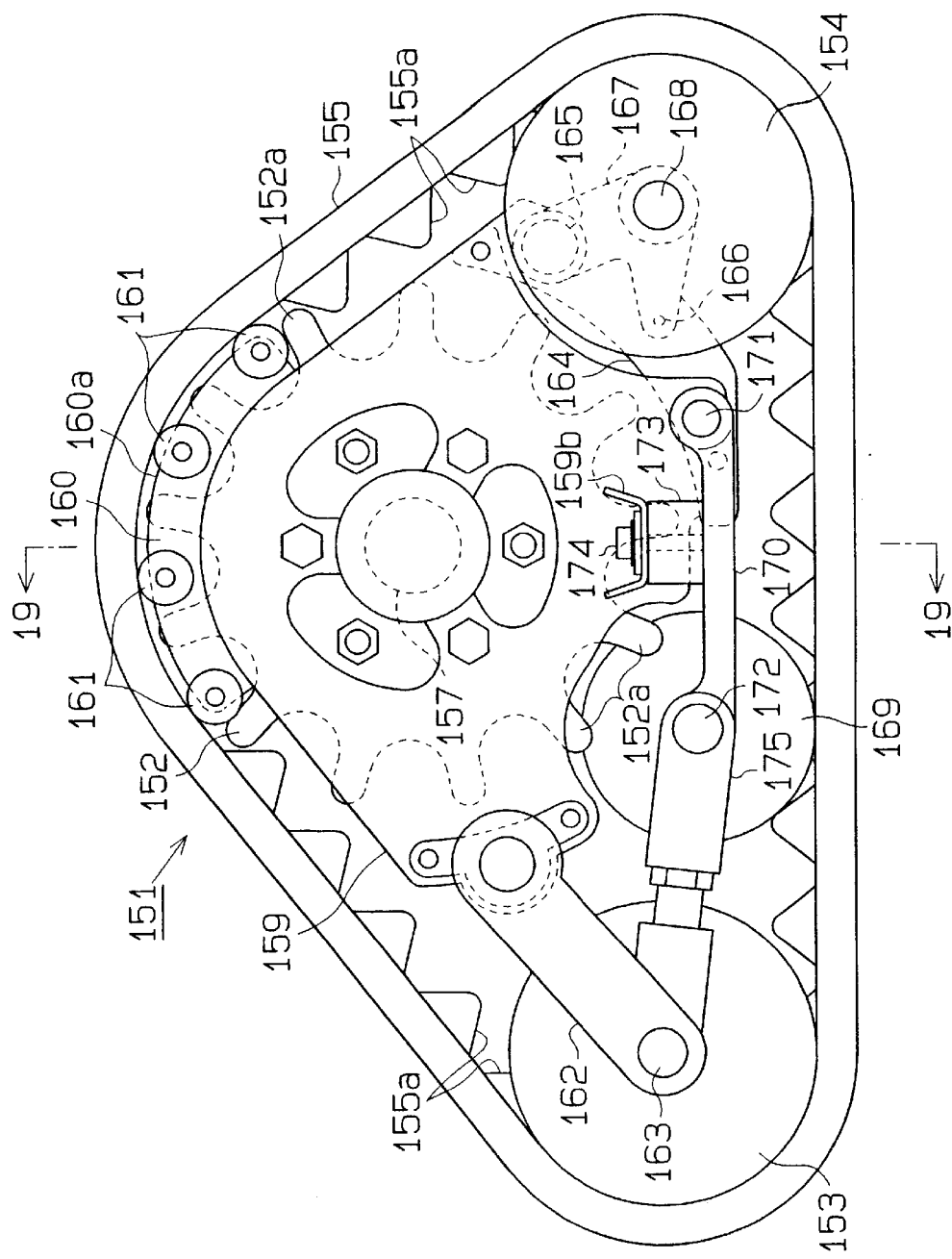
FIG. 18 is a side view showing a crawler according to a fourth embodiment of the present invention.
Figure 19:
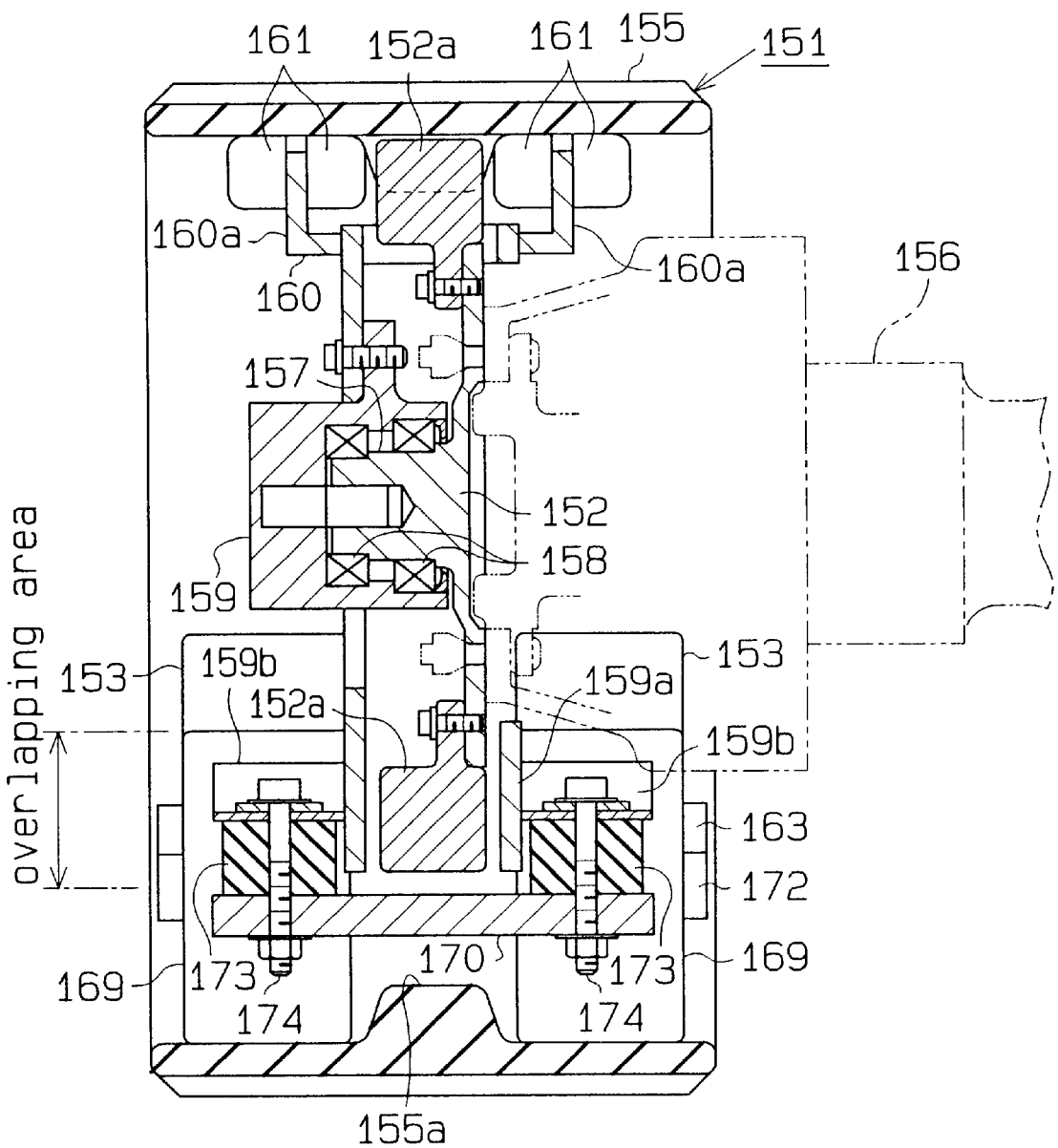
FIG. 19 is a cross-sectional view taken along line 19—19 in FIG. 18.

As shown in FIGS. 18 and 19, a triangular crawler 151 includes a drive wheel (sprocket) 152, a pair of axially aligned first drive wheels (front driven wheels) 153, and a rubber belt 155. The belt 155 wound about the wheels 152, 153, 154 defines a triangular shape. The drive wheel 152 is coupled to a drive shaft 156 and rotates integrally with the shaft 156.

A shaft 157 projects outward (upward from the plane of FIG. 18) from the center of the drive wheel 152. The drive wheel 152 is supported by a frame 159 with a bearing 158, which is fit onto the shaft 157, allowing relative rotation between the drive wheel 152 and the frame 159. A plurality of teeth 152a project from the periphery of the drive wheel 152. The teeth 152a engage with projections 155a, which project from the inner surface of the belt 155.

A bracket 160 is fixed to the upper section of the frame 159. The bracket 160 extends in an arc-like manner along the upper peripheral edge of the drive wheel 152. The bracket 160a includes a pair of arms 160a which have a predetermined interval between each other. Each arm 160a is provided with eight guide rollers 161, four on its left side and four on its right side (16 in total). A portion of the drive wheel 152 is between the rollers 161 of each arm 160a. The rollers 161 are abutted against the belt 155.

A link 162 is rotatably connected to the front side (left side as viewed in FIG. 18) of the frame 159. A shaft 163 is supported by the distal section of the link 162. The pair of first drive wheels 153 is rotatably supported by the shaft 163. A supporter 164 is fixed to the rear side (right side as viewed in FIG. 18) of the frame 159. An L-shaped bracket 167 is secured to the supporter 164 by a shaft 165 and a shear pin 166. The second wheels 154 are rotatably coupled to the ends of a shaft 168, which is supported by the distal section of the bracket 167. The shear pin 166 is provided with strength that enables the pin 166 to break when the load applied to the second wheel 154 exceeds a predetermined level.

As shown in FIGS. 18 and 19, the intermediate wheels 169 are located between the first and second wheels 153, 154 at a position slightly closer to the first wheel 153. As shown in FIG. 19, a cover 159a, which partially covers the left and right sides of the drive wheel 152, is defined at the lower section of the frame 159. The lower section of the supporter 164 is fixed to the cover 159a. A link 170, which extends in a substantially horizontal section, has one end that is rotatably coupled to the cover 159a by a connecting pin 171. The pair of intermediate wheels 169 are rotatably supported by a shaft 172. A pair of holders 159b project from the left and right sides of the cover 159a, which interpose the drive wheel 152. A cylindrical elastic member 173, which is made of rubber, is secured between the link 170 and each holder 159b by guide pins 174.

A link 175, which length is adjustable, connects the shafts 172, 163 to each other. The length of the link 175 is adjusted to vary the tension of the belt 155. The links 162, 170, 175, and the frame 159 constitute a four-segment linking mechanism. Deformation of the linking mechanism changes the position of the first wheels 153 with respect to the intermediate wheels 169.

As shown in FIGS. 18 and 19, a portion of the drive wheel 152 is inserted between the space defined between the intermediate wheels 169. This enables a portion of the drive wheel 152 to be arranged overlapping the intermediate wheels 169, as viewed in FIG. 18. The structure of this embodiment enables the drive wheel 152 and the intermediate wheels 169 to have a rather large diameter while also allowing the crawler 151 to be flattened. The crawler 151 may be flattened so that it may used in combination with normal wheels. In other words, a pair of crawlers 151 may be mounted on either the front or rear side of the vehicle while a pair of wheels are mounted on the other side. The crawlers 151 are flattened in correspondence with the diameter of the wheels so that the body of the vehicle becomes horizontal. The first wheels 153 and the intermediate wheels 169 are shown in FIG. 18 with each of their outer wheel removed.

As described above, in the crawler 151 of this embodiment, the drive wheel 152 is overlapped with the intermediate wheels 169 by arranging a portion of the drive wheel 152 between the pair of axially aligned intermediate wheels 169. This structure enables the crawler 151 to be flattened without minimizing the diameters of the drive wheel 152 and the intermediate wheels 169. The intermediate wheels 169 are supported by the link 170, which extends horizontally from the cover 159a. By supporting the intermediate wheels 169 from the outer side, the space defined between the intermediate wheels 169 becomes free of parts required to support the wheel 169. This structure ensures sufficient space required between the wheels 169. This allows the overlapping area of the drive wheel 152 and the intermediate wheels 169 to be increased. In addition, this structure enables the drive wheel 152 to have a thickness that is limited only by the width of the space defined between the wheels of the intermediate wheel 169. That is, the thickness of the drive wheel 152 may be substantially equal to the width of the space defined between the pair of axially aligned intermediate wheels 169.

Due to the above overlapping structure, the lateral width of the teeth 152a projecting from the drive wheel 152 is smaller than the space defined between the intermediate wheels 169. However, as shown in FIG. 19, the belt 155 is supported by the guide rollers 161, which are located next to the section where the teeth 152a of the drive wheel 152 engage with the belt 155. This prevents the belt 155 from falling off the drive wheel 152. In addition, the guide rollers 161 roll to reduce the friction produced between the rollers 161 and the belt 155.

The overlapping structure enables the crawlers 151 to be flattened and thus allows the diameter of the drive wheel 152 to be maximized. Therefore, the maximum speed of the crawler vehicle remains the same regardless of the crawlers 151 being flattened. In addition, the amount of fuel consumed by the engine remains substantially the same even when the crawlers 151 are flattened. Since the diameter of the intermediate wheels 169 need not be minimized, the engaging ratio between the wheels 169 and the belt 155 is maintained at a high level. This prevents the belt 155 from falling off the intermediate wheels 169.

The drive wheel 152 and the driven wheels 153, 154, 169 of each crawler 151 is exposed to the atmosphere when installed on the crawler vehicle. Thus, there is a possibility of foreign material being caught between the constituents of the crawler 151 and stopping the rotation of the belt 155. This may cause the crawler 151 to be pivoted about the shaft 157. Such state results in application of excessive load to the shafts 153, 154, 169.

However, the crawler 151 has a linking mechanism constituted by the links 162, 170, 175 that deforms when load is applied to the first wheels 153. The linking mechanism enables the positions of the first wheels 153 and the intermediate wheels 169 to be moved toward each other. This shortens the path along which the belt 155 rotates. That is, this shortens the circumscribed periphery defined along the wheels 152, 153, 154, 169. The displacement of the wheels 153, 169 enables the belt 155 to be rotated and prevents the crawler 151 from being pivoted, or tilted.

If the load applied to the wheels 153, 154, 169 exceeds a level at which the linking mechanism is not able to handle, the shear pin 166 is broken by the excessive load. This allows the second wheels 154 to be pivoted about the shaft 165. When the crawler 151 moves over obstacles, the linking mechanism is deformed to reduce the impact caused by the obstacle.

The intermediate wheels 169 are supported by the link 170, which extends substantially along a horizontal direction from the cover 159a. This enables sufficient space to be provided between the pair of intermediate wheels 169. Accordingly, the overlapping area between the drive wheel 152 and the intermediate wheels 169 may be increased. Since the link 170 is provided below the driven wheel 152, the teeth 152a of the drive wheel 152 may be widened until their width substantially matches the width of the space defined between the wheels 169.

Although only four embodiments of the present invention have been described herein, it should be apparent to those skilled in the art that the present invention may be embodied in many other specific forms without departing from the spirit or scope of the invention. Particularly, it should be understood that the above embodiments may be modified as described below.

In the first embodiment, a sensor may be provided in either the rollers 35 or the stopper bars 33 to detect contact between the rollers 35 and the belt 14. When contact is detected, a computer may be employed to judge whether the tilting of the crawler 3 has exceeded a predetermined angle and warn the driver in such case.

In the first embodiment, the angle of the belt 14 defined between the sides interposing the first wheels 12 is smaller than the angle of the belt 14 defined between the sides interposing the second wheels 13. Thus, the belt 14 of the crawler 3 defines a non-symmetrical triangular shape. However, the above angles defined by the belt 14 may be equal to each other such that the belt 14 defines a triangle symmetrical about the drive wheel 11.

In the first embodiment, the bracket 34 may be fastened to the side frame 31 by bolts.

In the first embodiment, the rollers 35 may be substituted by fixed cylindric bodies or pillar-like bodies. In this case, for example, the flat section of the pillar-like bodies is arranged to come into contact with the belt 14. Furthermore, the stopper units 32 may be substituted by a flat or curved plate.

In the first embodiment, the brackets 34 may be constructed so as to be extensible to adjust the abutting position of the rollers 35 and the belt 14.

In the first embodiment, the rollers 35 are rotatably supported on the ends of the stopper bars 33. Instead of this structure, a roller may be attached to the distal end of a supporter bar extending from one side of the side frame 31 to restrict the tilting of the associated crawler 3.

In the third and fourth embodiments, the guide rollers may be provided on only one side of the section where the drive wheel engages with the belt instead of providing the rollers on both sides. The tension of the belt is still ensured in this case, and the belt is prevented from falling off the drive wheel.

In the third and fourth embodiments, if an overlapping structure is possible, an appropriate supporting structure may be employed to substitute for the structure constituted by the links 124, 125 and the sub frame 139 to support the driven wheels 104, 105, 135, 136.

In the third and fourth embodiments, rubber need not be used as the material of the elastic members 144 that urges the intermediate wheels 135, 136 in a downward direction. For example, a coil spring, or the like, may be employed as the elastic member 144.

In the third and fourth embodiments, the pair of aligned driven wheels may be arranged directly below the drive wheel.

In the third and fourth embodiments, three or more pairs of intermediate wheels may be provided. Increasing the number of pairs of intermediate wheels ensures the desired meshing ratio to be obtained between the intermediate wheels and the drive wheel. Furthermore, minimizing the diameter of the intermediate wheels enables an increase in the overlapping area and facilitates flattening of the crawler. The pairs of intermediate wheels may each have different diameters.

In the third and fourth embodiments, the bottom section of the main frame may be extended downward so as to avoid the driven wheel. The intermediate wheels may be supported by the extended section of the frame.

In the third and fourth embodiments, the number of the rollers is not limited as long as at least one is provided.

In the third embodiment, the shafts which support the intermediate wheels may be projected outward from the side walls of the beam 139a to rotatably support the intermediate wheels. This structure allows the shafts to be provided at locations overlapping the drive wheel and allows a further increase in the overlapping area of the drive wheel and the intermediate wheels.

In the third embodiment, the diameter of the drive wheel 103 is about 70 percent the diameter of the replaced normal wheel. Satisfactory performance from the view point of maximum speed capacity and fuel efficiency is obtained when the diameter of the drive wheel 103 is 70 to 80 percent the diameter of the replaced wheel. However, the diameter of the drive wheel 103 is not limited to this range and may be larger than 80 percent the diameter of the replaced wheel.

In the fourth embodiment, the arms 170 of each crawler 151 may be curved downward to avoid the drive wheel 152 and increase the overlapping section of the drive wheel 152 and the intermediate wheels 169.

In the third and fourth embodiments, a pipe may be arranged extending along the belt to substitute the guide rollers 120, 161. In this case, the pipe does not constantly contact the belt. However, when the belt moves laterally, the pipe abuts against the projections of the belt and restricts further lateral movement of the belt.

The crawler apparatuses of the third and fourth embodiments may be applied to industrial vehicles such as forklifts.

In the third embodiment, the front and rear intermediate wheels may be provided separately from the sub frame so as to enable each pair of intermediate wheels to incline independently in lateral directions. The third embodiment originally provides front and rear intermediate wheels 135, 136, which incline synchronously. Therefore, when the inclination of the belt 106 differs at separate portions, the contact area (engaging ratio) between the belt 106 and the intermediate wheels 135, 136 becomes small. However, sufficient contact area (engaging ratio) between the intermediate wheels and the belt may be achieved by allowing independent inclining of the front and rear driven wheels.

Sets of front and rear the intermediate wheels are not a requisite to the third embodiment. For example, a single pair of wheels or a single wheel may be provided directly below the drive wheel to serve as the intermediate wheel.

In the third embodiment, elastic members may be arranged at any appropriate location to absorb the vibrations of the intermediate wheels. For example, the shaft 137 may be supported by the sub frame 139 with the shaft 137 inserted through an elastic member such as a rubber bushing. In this case, the rubber bushing 142 is eliminated from the structure and the sub frame 139 is rotatably connected to the stay 122 by the bolt 138.

In the third embodiment, the material of the elastic member, which absorbs the vibrations of the intermediate wheel, is not limited to rubber. For example, a spring, such as the leaf spring described in Japanese Unexamined Utility Publication No. 62-25286, may be attached to the sub frame 139, which is rotatable about the main frame 117, to absorb the vibrations of the intermediate wheels. As another option, the shafts 137 may be inserted through an elongated hole so as to allow vertical displacement of each shaft 137 with respect to the sub frame 139. A pair of left and right leaf springs may be arranged on opposite sides of the sub frame 139 to urge the shaft 137 in a downward direction. Resonance may be prevented by selecting a leaf spring having an appropriate frequency.

In the third embodiment, the crawlers are not required to adopt the overlapping structure.

The third embodiment may be employed in crawlers which are not triangular. For example, the third embodiment may be employed in a crawler which first and second wheels may be displaced in an upward direction so as to enable the crawler to become pentagonal.

Therefore, the present examples and embodiments are to be considered as illustrative and not restrictive and the invention is not limited to the details given herein, but may be modified within the scope of the appended claims.

What is claimed is:

1. A crawler apparatus for a vehicle, wherein the vehicle has at least one drive shaft, the apparatus comprising:

a drive wheel arranged to connect to the drive shaft;

a pair of driven wheels each supported below the drive wheel by a shaft, one of the driven wheels being spaced from the other in the travelling direction of the vehicle;

least one intermediate driven wheel supported by a shaft between said driven wheels;

a belt wound about the drive wheel, the driven wheels and the intermediate driven wheel, wherein the drive wheel drives the belt;

a frame for supporting said drive wheel;

a subframe for supporting said intermediate driven wheel, wherein said subframe is located below said drive wheel and is attached to said frame such that the subframe is pivotal about an axis that extends in the travelling direction of the vehicle; and wherein said drive wheel is located in a position such that it overlaps with the intermediate driven wheel from a lateral viewpoint.

2. The apparatus as set forth in claim 1, wherein the shaft of the intermediate driven wheel is located at a position that is below the drive wheel and spaced from a vertical plane that contains the axis of the drive wheel by a predetermined distance in the direction of travel of the vehicle.

3. The apparatus as set forth in claim 2 further comprising at least one additional intermediate driven wheel supported by the subframe and coaxial with the other intermediate driven wheel with a gap therebetween, wherein a part of said drive wheel occupies said gap.

4. The apparatus as set forth in claim 1, wherein said subframe includes a support shaft for pivotally connecting said subframe to said frame, said support shaft extending in the direction of travel of the vehicle, and wherein said at least one intermediate driven wheel is at least two pairs of intermediate driven wheels, said subframe further including an urging means for restricting pivotal motion of the subframe, and wherein said urging means urges said subframe so as to bias the axes of the intermediate driven wheels to be parallel to the drive shaft.

5. The apparatus as set forth in claim 4, wherein the axis of said subframe support shaft is located in a position that is lower than the axes of said pair of driven wheels.

6. The apparatus as set forth in claim 1, wherein said frame has a first pair of links for supporting the shaft of one of the driven wheels of said pair of driven wheels and a second pair of links for supporting the shaft of the other driven wheel, wherein said each link has a first end and second end, wherein each said first end is pivotally connected to the frame and wherein said each second end is connected to the shaft of its associated driven wheel.

7. The apparatus as set forth in claim 1, wherein said frame has a bracket pivotally connecting one of the driven wheel shafts to the frame, and wherein said bracket has a first end and a second end, wherein said first end is pivotally connected to the frame and said second end is connected to the frame with a shear pin, and wherein said pin is provided with strength that enables it to break when a predetermined load is applied thereto.

8. The apparatus as set forth in claim 4, wherein said subframe support shaft has at least a pair of bearings located between said frame and said subframe, and wherein said subframe support shaft is supported by an elastomeric member provided between the support shaft and the each bearing.

9. The apparatus as set forth in claim 4, wherein said urging means further includes a bracket connected to the subframe for restricting movement of the subframe with respect to the frame.

10. The apparatus as set forth in claim 1, wherein said drive wheel has a peripheral edge and a plurality of teeth formed on the peripheral edge, wherein said belt has a inner surface and a plurality of teeth formed on the inner surface and wherein the teeth of the belt are arranged to engage with the teeth of the drive wheel for driving the belt.

11. The apparatus as set forth in claim 1 further comprising a guide member for guiding said belt, wherein said drive wheel has a pair of side surfaces, and wherein said guide member is located near at least one side surface of the drive wheel and in a position corresponding to a location where the belt is engaged with the drive wheel.

12. The apparatus as set forth in claim 11, wherein said guide member includes a plurality of rollers, wherein said rollers are rotatably attached to the frame near both side surfaces of the drive wheel.

13. The apparatus as set forth in claim 1, wherein said vehicle has a pair of front wheel recesses and a pair of rear wheel recesses, and wherein each wheel recess is provided with one said drive shaft and one said crawler apparatus.

14. The apparatus as set forth in claim 1, wherein each said drive shaft serves as a pivot axis of each crawler apparatus such that each crawler apparatus is pivotally attached to its associated drive shaft, said vehicle further comprising:

stopping means for stopping pivotal displacement of at least one of the crawler apparatuses by contact with the belt thereof, wherein said stopping means is located in a position to abut the belt of said at least one crawler apparatus when said at least one crawler apparatus pivots in a first direction to a predetermined angle.

15. The apparatus as set forth in claim 14, wherein said stopping means includes a gliding means for reducing a running resistance of the belt when the belt contacts said gliding means.

16. The apparatus as set forth in claim 15, wherein said gliding means is set in a position where a part of the belt between the drive wheel and the driven wheel contacts the gliding means when the crawler apparatus contacts the stopping means.

17. The apparatus as set forth in claim 15, wherein said stopping means includes a bar extending along a direction perpendicular to the travelling direction of the vehicle and wherein said gliding means includes at least one roller rotatably attached to said bar.

18. The apparatus as set forth in claim 14, wherein said vehicle has an additional stopping means, wherein said additional stopping means is located at a position to limit pivotal motion of said at least one crawler apparatus in a second direction opposite to said first direction.

19. A crawler apparatus for a vehicle, wherein the vehicle has at least one drive shaft, the apparatus comprising:

a drive wheel arranged to connect to the drive shaft;

a pair of driven wheels each supported below the drive wheel by a shaft, one of the driven wheels being spaced from the other in the travelling direction of the vehicle;

least one intermediate driven wheel supported by a shaft between said driven wheels;

a belt wound about the drive wheel, the driven wheels and the intermediate driven wheel, wherein the drive wheel drives the belt;

a frame for supporting said drive wheel;

a subframe for supporting said intermediate driven wheel, wherein said subframe is located below said drive wheel and is swingably attached to said frame and wherein said subframe has an upper surface facing said drive wheel, and wherein said upper surface is curved in an arc-like manner to generally conform to the shape of the drive wheel; and wherein said drive wheel is located in a position such that it overlaps with the intermediate driven wheel from a lateral viewpoint, and the shaft of the intermediate driven wheel is located at a position that is below the drive wheel and spaced from a vertical plane that contains the axis of the drive wheel by a predetermined distance in the direction of travel of the vehicle.

20. The apparatus as set forth in claim 19, wherein said subframe has a first end and a second end, wherein said subframe is attached to the frame by way of its first and second ends.

21. A crawler vehicle having at least one drive shaft and a plurality of crawler apparatuses, each said crawler apparatus having:

a drive wheel arranged to connect to the drive shaft;

a pair of driven wheels each supported below the drive wheel by a shaft, one of the driven wheels being spaced from the other in the travelling direction of the vehicle;

at least one intermediate driven wheel supported by a shaft between said driven wheels;

a belt wound about the drive wheel, the driven wheels and the intermediate driven wheel, wherein the drive wheel drives the belt;

wherein said vehicle has a pair of wheel recesses and wherein each wheel recess of said pair is provided with one of said crawler apparatuses;

wherein said drive shaft serves as a pivot axis of each crawler apparatus such that each crawler apparatus is pivotally attached to its associated drive shaft; and stopping means for stopping pivotal displacement of the crawler apparatuses by contact with the belt thereof, wherein said stopping means is located in a position to abut the belts of said crawler apparatuses when said crawler apparatuses pivot in a first direction to a predetermined angle.

22. The vehicle as set forth in claim 21, wherein said stopping means includes a gliding means for reducing a running resistance of the belt when the belt contacts said gliding means.

23. The vehicle as set forth in claim 22, wherein said gliding means is set in a position where a part of the belt between the drive wheel and the driven wheel contacts the gliding means when the crawler apparatus contacts the stopping means.

24. The vehicle as set forth in claim 22, herein said stopping means includes a bar extending along a direction perpendicular to a travelling direction of the vehicle and wherein said gliding means includes at least one roller rotatably attached to said bar.

25. The vehicle as set forth in claim 21, wherein said vehicle has an additional stopping means, wherein said additional stopping means is located at a position to limit pivotal motion of said at least one crawler apparatus in a second direction opposite to said first direction.

26. The vehicle as set forth in claim 25, wherein said stopping means includes a first bar, and wherein said additional stopping means includes a second bar, and wherein said first and second bars are connected with each other by a connecting means so as to reinforce the bars.

27. A crawler apparatus for a vehicle, wherein the vehicle has at least one drive shaft, the apparatus comprising:

a drive wheel arranged to connect to the drive shaft;

a pair of driven wheels each supported below the drive wheel by a shaft, one of the driven wheels being spaced from the other in the travelling direction of the vehicle;

at least one intermediate driven wheel supported by a shaft between said driven wheels;

a belt wound about the drive wheel, the driven wheels and the intermediate driven wheel, wherein the drive wheel drives the belt;

a frame for supporting said drive wheel; and a subframe for supporting said intermediate driven wheel, wherein said subframe is located below said drive wheel and is attached to said frame such that the subframe is pivotal about an axis that extends in the travelling direction of the vehicle.

28. The apparatus as set forth in claim 27, wherein said subframe includes a support shaft for pivotally connecting said subframe to said frame, said support shaft extending in the direction of travel of the vehicle, and wherein said at least one intermediate driven wheel is at least two pairs of intermediate driven wheels, said subframe further including an urging means for restricting pivotal motion of the subframe, and wherein said urging means urges said subframe so as to bias the axes of the intermediate driven wheels to be parallel to the drive shaft.

29. The apparatus as set forth in claim 28, wherein the axis of said subframe support shaft is located in a position that is lower than the axes of the intermediate driven wheels.

30. The apparatus as set forth in claim 28, wherein said subframe support shaft has at least a pair of bearings located between said frame and said subframe, and wherein said subframe support shaft is supported by an elastomeric member provided between the support shaft and the each bearing.

31. The apparatus as set forth in claim 28, wherein said urging means further includes a bracket connected to the subframe for restricting movement of the subframe with respect to the frame.

* * * * *